US012745313B2

(12) United States Patent
Kim et al.

(10) Patent No.: US 12,745,313 B2
(45) Date of Patent: Sep. 22, 2026

(54) SMALL DATA TRANSMISSION OF NON-ACCESS STRATUM (NAS) MESSAGES AND UPLINK (UL) USER DATA PACKETS DURING A RADIO RESOURCE CONTROL (RRC) INACTIVE STATE

(71) Applicant: QUALCOMM Incorporated, San Diego, CA (US)

(72) Inventors: Sunghoon Kim, San Diego, CA (US); Lenaig Genevieve Chaponniere, La Jolla, CA (US); Amer Catovic, San Diego, CA (US); Ruiming Zheng, Beijing (CN); Masato Kitazoe, Hachiouji (JP); Ozcan Ozturk, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 405 days.

(21) Appl. No.: 18/552,503

(22) PCT Filed: May 13, 2021

(86) PCT No.: PCT/CN2021/093541

§ 371 (c)(1),
(2) Date: Sep. 26, 2023

(87) PCT Pub. No.: WO2022/236762

PCT Pub. Date: Nov. 17, 2022

(65) Prior Publication Data

US 2024/0049340 A1 Feb. 8, 2024

(51) Int. Cl.
*H04W 76/27* (2018.01)

(52) U.S. Cl.
CPC .................................. *H04W 76/27* (2018.02)

(58) Field of Classification Search
CPC .................................................... H04W 76/27
See application file for complete search history.

(56) References Cited

U.S. PATENT DOCUMENTS

2009/0247176 A1* 10/2009 Song .................... H04W 76/38 455/450
2019/0349825 A1* 11/2019 Tseng .................... H04W 48/20
(Continued)

FOREIGN PATENT DOCUMENTS

CN 108141751 A 6/2018
GB 2560756 A 9/2018
(Continued)

OTHER PUBLICATIONS

Intel Corporation: "Summary of Offline [AT113bis-e] [504] [SDT] LS to CT1 (Intel)", 3GPP Draft, 3GPP TSG RAN WG2 Meeting #113bis-e, R2-2104399, 3rd Generation Partnership Project, Mobile Competence Centre, 650, Route Des Lucioles, F-06921 Sophia-Antipolis Cedex, France, vol. RAN WG2, No. Electronic meeting, Apr. 12, 2021-Apr. 20, 2021, Apr. 19, 2021, XP051996173, 29 pages, page 2, line 1—p. 27, last line.
(Continued)

*Primary Examiner* — Jeffrey M Rutkowski
(74) *Attorney, Agent, or Firm* — Shumaker & Sieffert, P.A.

(57) ABSTRACT

Aspects of the disclosure relate to providing, from a non-access stratum (NAS) layer to an access stratum (AS) layer associated with a user equipment (UE) while the UE is in a radio resource control (RRC) inactive state, a NAS message to be transmitted to a mobility management entity via a base station; providing, from the NAS layer, a request to resume an RRC connection; and transmitting the NAS message to
(Continued)

the base station while the UE is in the RRC inactive state. Other aspects, embodiments, and features are also claimed and described.

26 Claims, 12 Drawing Sheets

(56) References Cited

U.S. PATENT DOCUMENTS

| | | | | |
|---|---|---|---|---|
| 2019/0357295 | A1* | 11/2019 | Kim | H04W 76/25 |
| 2020/0053791 | A1 | 2/2020 | Ozturk et al. | |
| 2020/0053818 | A1* | 2/2020 | Sillanpaa | H04W 60/02 |
| 2020/0214070 | A1* | 7/2020 | Ingale | H04W 12/106 |
| 2021/0314860 | A1* | 10/2021 | Chen | H04W 52/0209 |
| 2021/0385727 | A1* | 12/2021 | Ohlsson | H04W 76/27 |
| 2023/0040675 | A1* | 2/2023 | Gupta | H04W 76/27 |
| 2023/0388967 | A1* | 11/2023 | Chang | H04W 76/11 |
| 2024/0089889 | A1* | 3/2024 | Yamamoto | H04W 8/183 |
| 2024/0314845 | A1* | 9/2024 | Liu | H04W 48/18 |

FOREIGN PATENT DOCUMENTS

| | | | |
|---|---|---|---|
| WO | 2018171527 | A1 | 9/2018 |
| WO | 2020036753 | | 2/2020 |
| WO | 2020088928 | A1 | 5/2020 |
| WO | 2020256420 | A1 | 12/2020 |
| WO | 2021002632 | A1 | 1/2021 |

OTHER PUBLICATIONS

NEC: “Discuss on Solutions for Arriving of Non-SDT Data During SDT”, 3GPP Draft, 3GPP TSG-RAN WG2 #113bis electronic, R2-2103299, 3rd Generation Partnership Project, Mobile Competence Centre, 650, Route Des Lucioles, F-06921 Sophia-Antipolis Cedex, France, vol. RAN WG2, No. electronic, Apr. 12, 2021-Apr. 20, 2021, Apr. 2, 2021, XP052174886, 4 pages, The Whole Document.

Supplementary European Search Report—EP21941335—Search Authority—Berlin—Dec. 18, 2024.

International Search Report and Written Opinion—PCT/CN2021/093541—ISA/EPO—Feb. 10, 2022 9 Pages.

NEC: “Discuss on Solutions for Arriving of Non-SDT Data During SDT”, 3GPP Draft, 3GPP TSG-RAN WG2 #113bis Electronic, R2-2103299, Online, Apr. 12-Apr. 20, 2021, 4 Pages, Section 2.

RAN2: “LS to CT1 on Small Data Transmission”, 3GPP Draft, 3GPP TSG CT WG1 Meeting #130-e, C1-212849, Electronic Meeting, May 20-28, 2021, 2 Pages, Section 2.

Intel Corporation: “Summary of Offline [AT113bis-e] [504] [SDT] LS to CT1 (Intel)”, 3GPP TSG RAN WG2 Meeting #113bis-e, R2-2104399, 3rd Generation Partnership Project, Mobile Competence Centre, 650, Route Des Lucioles, F-06921 Sophia-Antipolis Cedex, France, vol. RAN WG2, No. Electronic meeting, Apr. 12, 2021-Apr. 20, 2021, Apr. 23, 2021, XP051996173, 29 pages.

* cited by examiner

User Plane Protocol Stack

UE
NAS
RRC
PDCP
RLC
MAC
PHY
gNB
RRC
PDCP
RLC
MAC
PHY
AMF
NAS

Control Plane Protocol Stack

FIG. 10

SMALL DATA TRANSMISSION OF NON-ACCESS STRATUM (NAS) MESSAGES AND UPLINK (UL) USER DATA PACKETS DURING A RADIO RESOURCE CONTROL (RRC) INACTIVE STATE

This application is a national stage application under 35 U.S.C. § 371 of PCT Application No. PCT/CN2021/093541, filed May 13, 2021. The entire contents of PCT Application No. PCT/CN2021/093541 is incorporated herein by reference in its entirety.

TECHNICAL FIELD

The technology described below relates generally to wireless communication systems, and more particularly, to low latency communication of non-access stratum messages and uplink user data packets from an inactive state.

INTRODUCTION

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method of wireless communication at a user equipment is disclosed. In a more particular example, the method includes: providing, from a non-access stratum (NAS) layer to an access stratum (AS) layer associated with a user equipment (UE) while the UE is in a radio resource control (RRC) inactive state, a NAS message to be transmitted to a mobility management entity via a base station; providing, from the NAS layer, a request to resume an RRC connection; and transmitting the NAS message to the base station while the UE is in the RRC inactive state.

In another example, a method of wireless communication at a user equipment is disclosed. In a more particular example, the method includes: enabling, by a non-access stratum (NAS) layer associated with a user equipment (UE) while the UE is in a radio resource control (RRC) inactive state, transmission of an uplink (UL) user data packet associated with a protocol data unit (PDU) session to a base station; providing, from the NAS layer, a request to resume a radio resource control (RRC) connection; and transmitting the UL user data packet to the base station while the UE is in the RRC inactive state.

In yet another example, a method of wireless communication at a user equipment is disclosed. In a more particular example, the method includes: providing, from a non-access stratum (NAS) layer to an access stratum (AS) layer associated with a user equipment (UE) while the UE is in a radio resource control (RRC) inactive state, a NAS message to be transmitted to a base station; providing, from the NAS layer, a request to resume an RRC connection; receiving, from the AS layer to the NAS layer, an indication that the UE has transitioned to an RRC connected state; and transmitting, via the NAS layer, the NAS message to a mobility management entity subsequent to receiving the indication that the UE has transitioned to an RRC connected state.

In still another example, a wireless communication device is disclosed. In a more particular example, the wireless communication device includes: a transceiver; memory; and a processor communicatively coupled to the transceiver and the memory, the processor configured to: provide, from a non-access stratum (NAS) layer to an access stratum (AS) layer associated with a user equipment (UE) while the UE is in a radio resource control (RRC) inactive state, a NAS message to be transmitted to a mobility management entity via a base station; provide, from the NAS layer, a request to resume an RRC connection; and transmit, via the transceiver, the NAS message to the base station while the UE is in the RRC inactive state.

In a further example, a wireless communication device is disclosed. In a more particular example, the wireless communication device includes: a transceiver; memory; and a processor communicatively coupled to the transceiver and the memory, the processor configured to: enable, by a non-access stratum (NAS) layer associated with a user equipment (UE) while the UE is in a radio resource control (RRC) inactive state, transmission of an uplink (UL) user data packet associated with a protocol data unit (PDU) session to a base station; provide, from the NAS layer, a request to resume a radio resource control (RRC) connection; and transmit, via the transceiver, the UL user data packet to the base station while the UE is in the RRC inactive state.

In another further example, a wireless communication device is disclosed. In a more particular example, the wireless communication device includes: a transceiver; memory; and a processor communicatively coupled to the transceiver and the memory, the processor configured to: provide, from a non-access stratum (NAS) layer to an access stratum (AS) layer associated with a user equipment (UE) while the UE is in a radio resource control (RRC) inactive state, a NAS message to be transmitted to a base station; provide, from the NAS layer, a request to resume an RRC connection; receive, from the AS layer to the NAS layer, an indication that the UE has transitioned to an RRC connected state; and transmit, via the NAS layer using the transceiver, the NAS message to a mobility management entity subsequent to receiving the indication that the UE has transitioned to an RRC connected state.

These and other aspects of the technology described herein will become more fully understood upon a review of the detailed description, which follows. Other aspects, features, and embodiments will become apparent to those of ordinary skill in the art upon reviewing the following description of specific, exemplary embodiments in conjunction with the accompanying figures. While the following description may discuss various advantages and features relative to certain embodiments and figures, all embodiments can include one or more of the advantageous features described herein. In other words, while this description may discuss one or more embodiments as having certain advantageous features, one or more of such features may also be used in accordance with the various embodiments described herein. In similar fashion, while this description may discuss exemplary embodiments as device, system, or method embodiments, it should be understood that such exemplary embodiments can be implemented in various devices, systems, and methods.

BRIEF DESCRIPTION OF THE DRAWINGS

FIG. 10 is another call flow diagram illustrating an exemplary process for transmitting an NAS message and/or an uplink user data packet using small data transmission in accordance with some aspects of this disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

Figure 1:
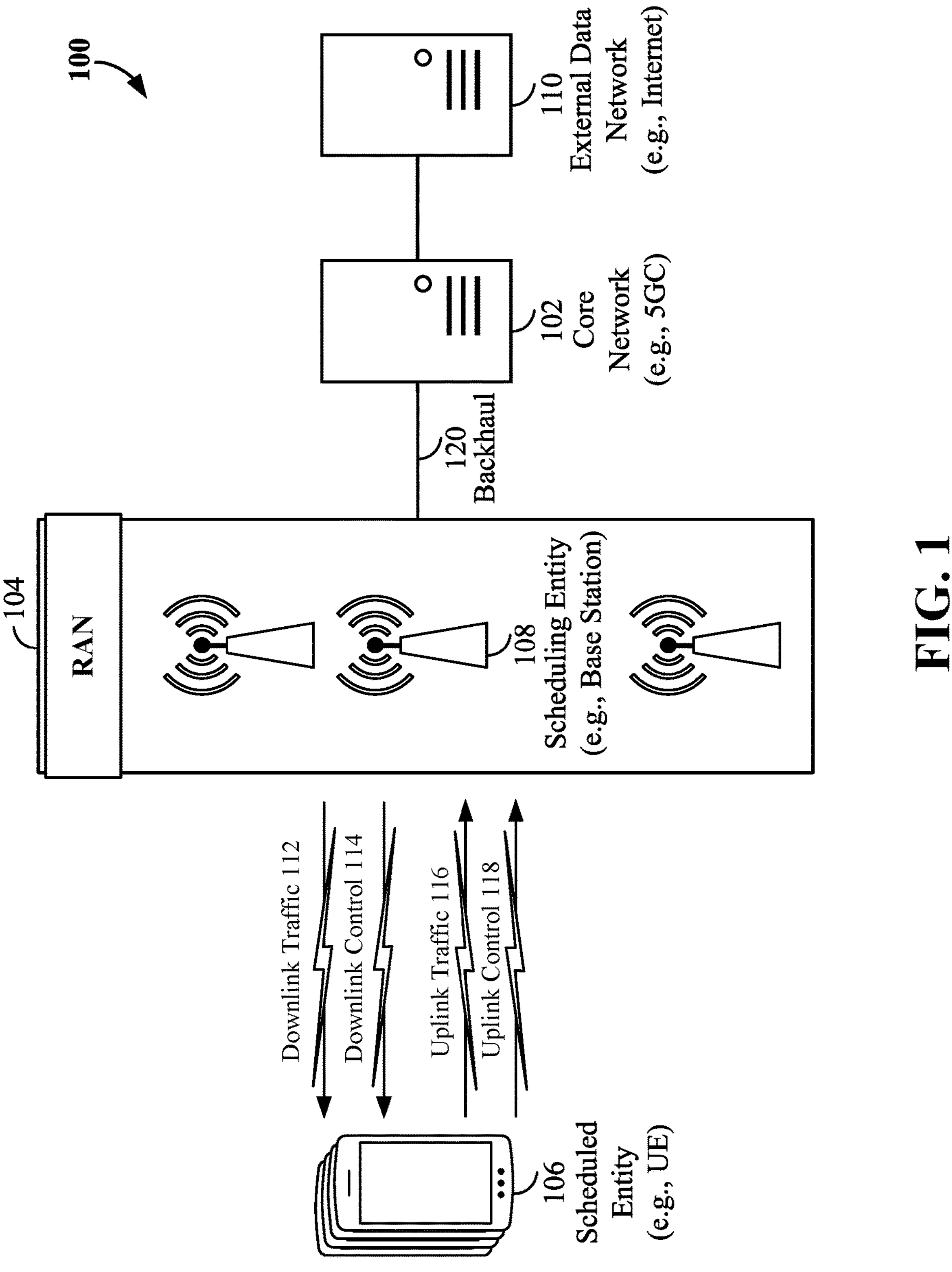
FIG. 1 is a schematic illustration of a wireless communication system in accordance with some aspects of this disclosure.

In some aspects of the disclosure, the NAS layer 802 may provide an indication (e.g., via a cause value) associated with the NAS message while the scheduled device is in the RRC inactive state. Such a cause value may cause the AS layer 804 to transmit the NAS message using SDT (e.g., if SDT is enabled). For example, the NAS layer 802 may be configured to determine whether to initiate transmission via SDT of messages that do not exceed a threshold size. In such an example, the NAS layer 802 may prompt the AS layer 804 to utilize an SDT session to transmit the NAS message (e.g., in lieu of the AS layer 804 determining whether to transmit the NAS message via an SDT message). The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (e.g., a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as described further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In some aspects, one or more of the UEs 106 may transition between various connection states. For example, in an idle state (e.g., a radio resource control (RRC) idle state), the UE may not be registered to any particular cell, and may reduce transmission and/or reception activity (e.g., by periodically monitoring paging messages, and performing other measurements to manage mobility). In a connected state (e.g., an RRC connected state), the UE may be registered to a particular cell, and mobility may be controlled by the network. The UE in the connected state may maintain one or more active communication sessions via the network, and may store an access stratum (AS) context (e.g., to facilitate secure communication between the UE and base station). In an inactive state (e.g., an RRC inactive state), the UE may be registered with a particular cell, and may store the AS context, but may reduce transmission and/or reception activity (e.g., by periodically monitoring paging messages, and performing other measurements to manage mobility). However, unlike the idle state, the UE may transition from the inactive state to the connected state relatively quickly (e.g., via a radio access channel (RACH) process). The UE may transition from the connected state to the inactive state when the UE receives a suspend message from the base station, and may transition back to the connected state without performing a registration process.

In general, the amount of data that may be communicated to and/or from the UE in the inactive state is limited. A mechanisms for small data transmission (SDT) may act as a mechanism to facilitate transmission of small amounts of data while the UE is in the inactive state, which may reduce latency (e.g., by transmitting and/or receiving data without re-establishing the connected state) and/or reduce power consumption (e.g., by allowing a UE to spend more time in an inactive state). A base station may enable a UE to communicate using an SDT session by allocating resources (e.g., associated with one or more signal radio bearers (SRBs) and/or data radio bearers (DRBs)) to the UE while the UE is in the inactive state. The UE may transmit and/or receive any suitable data using an SDT session that does not exceed a particular size (e.g., a size that may be transmitted using the SRBs and/or DRBs allocated to the UE for SDT).

Figure 2:
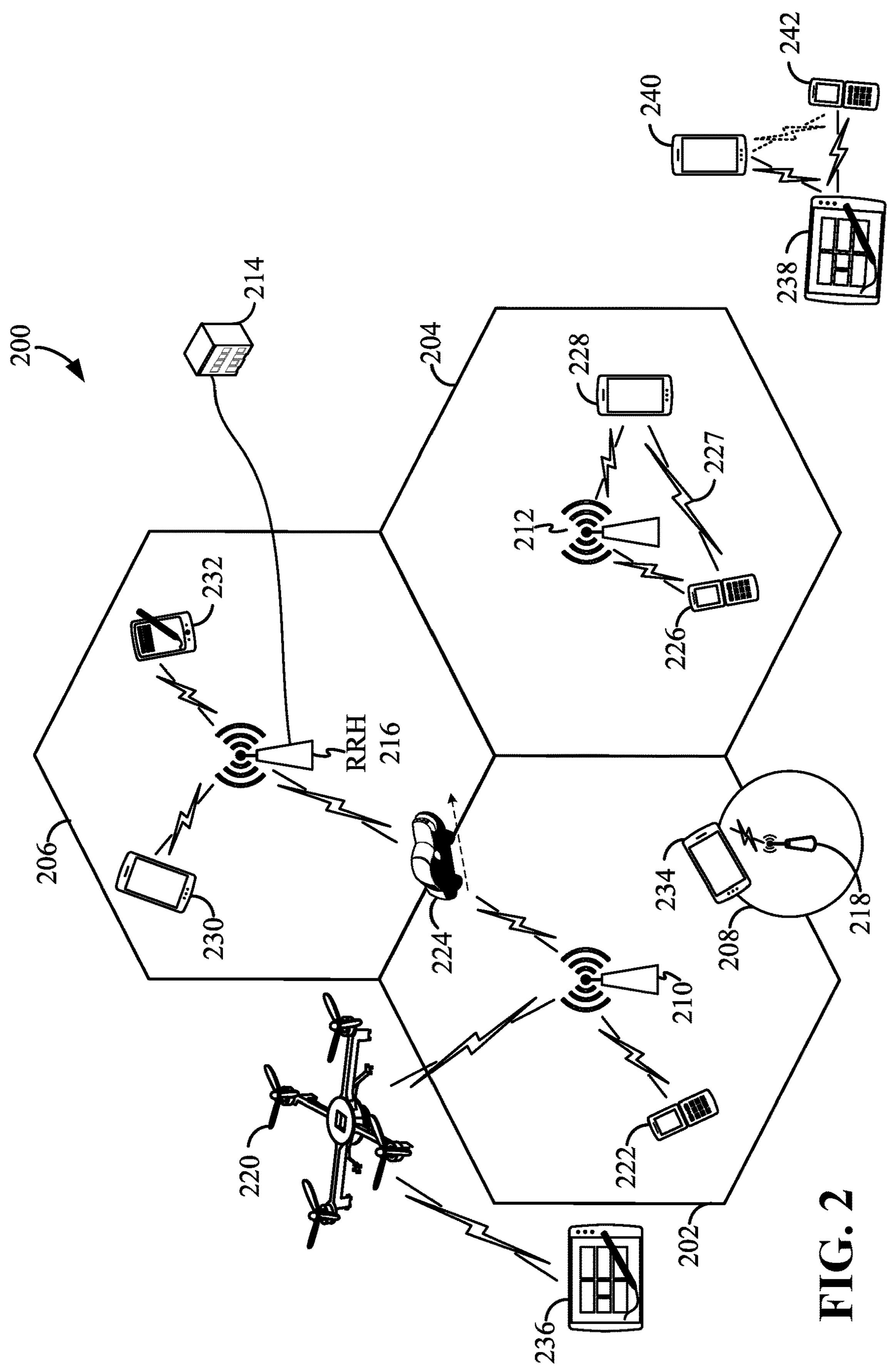
FIG. 2 is a conceptual illustration of an example of a radio access network in accordance with some aspects of this disclosure.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. An access and mobility management function (AMF, not illustrated, part of the core network 102 in FIG. 1) may generally set up, maintain, and release the various physical channels between the UE and the radio access network. The AMF may further include a security context management function (SCMF) that manages the security context for both the control plane and the user plane functionality, and a security anchor function (SEAF) that performs authentication.

Figure 3:
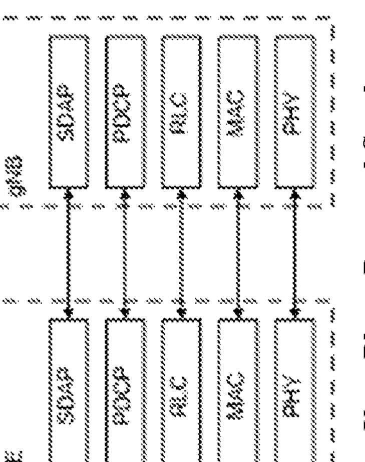
FIG. 3 is a schematic illustration of a user plane protocol stack and a control plane protocol stack in accordance with some aspects of this disclosure.

FIG. 3 is a schematic illustration of a user plane protocol stack and a control plane protocol stack in accordance with some aspects of this disclosure. In a wireless telecommunication system, the communication protocol architecture may take on various forms depending on the particular application. For example, in a 3GPP NR system, the signaling protocol stack is divided into a Non-Access Stratum (NAS) and an Access Stratum (AS) layers and protocols. The NAS provides upper layers, for signaling between a UE 106 and a core network 102 (referring to FIG. 1). The AS provides lower layers, for signaling between the core network 102 (e.g., 5GC) and the UE 106.

Turning to FIG. 3, a radio protocol architecture is illustrated with a user plane protocol and a control plane protocol, showing their respective stacks (e.g., layers or sublayers). Radio bearers between a base station and a UE may be categorized as data radio bearers (DRB) for carrying user plane data, corresponding to the user plane protocol; and signaling radio bearers (SRB) for carrying control plane data, corresponding to the control plane protocol.

In the AS, both the user plane and control plane protocols include a physical layer (PHY), a medium access control layer (MAC), a radio link control layer (RLC), and a packet data convergence protocol layer (PDCP). PHY is the lowest layer and implements various physical layer signal processing functions. The MAC layer provides multiplexing between logical and transport channels and is responsible for various functions. For example, the MAC layer is responsible for reporting scheduling information, priority handling and prioritization, and error correction through hybrid automatic repeat request (HARQ) operations. The RLC layer provides functions such as sequence numbering, segmentation and reassembly of upper layer data packets, and duplicate packet detection. The PDCP layer provides functions including header compression for upper layer data packets to reduce radio transmission overhead, security by ciphering the data packets, and integrity protection and verification.

In the user plane protocol stack, a service data adaptation protocol (SDAP) layer provides services and functions for maintaining a desired quality of service (QoS). And in the control plane protocol stack, a radio resource control (RRC) layer includes a number of functional entities for routing higher layer messages, handling broadcasting and paging functions, establishing and configuring radio bearers, NAS message transfer between NAS and UE, etc.

A NAS protocol layer provides for a wide variety of control functions between the UE 106 and core network 102. These functions include, for example, registration management functionality, connection management functionality, and user plane connection activation and deactivation.

In some aspects of the disclosure, the AS layer may transition the UE from a connected state (e.g., RRC connected) to an inactive state (e.g., RRC inactive state). As described above in connection with FIG. 1, the base station may enable small data transmission (SDT) while the UE is in an inactive state, which may reduce latency and/or reduce power consumption during periods of time when small data is to be transmitted and/or received. Without SDT enabled, the UE may be inhibited from transmitting and/or receiving NAS messages and/or data in the inactive state. For example, if the NAS layer generates a NAS message to be transmitted to the core network, the NAS layer may request that the AS layer resume the connected state, and the NAS layer may be inhibited from transmitting the NAS message while the UE remains in the inactive state.

In some aspects of the disclosure, the NAS layer of a UE that supports SDT and/or for which SDT is enabled (e.g., by the base station) may provide NAS messages to the AS layer in connection with a request to resume the connected state (e.g., may enable transmission of an UL user data packet for a PDU session). The AS layer may utilize resources associated with SDT to transmit a NAS message received from the NAS layer prior to the UE transitioning to the connected state. This may facilitate earlier communication of NAS messages and/or UL user data packets, and/or may facilitate reduced power consumption (e.g., by reducing the number of transitions to an RRC connected state).

Figure 4:
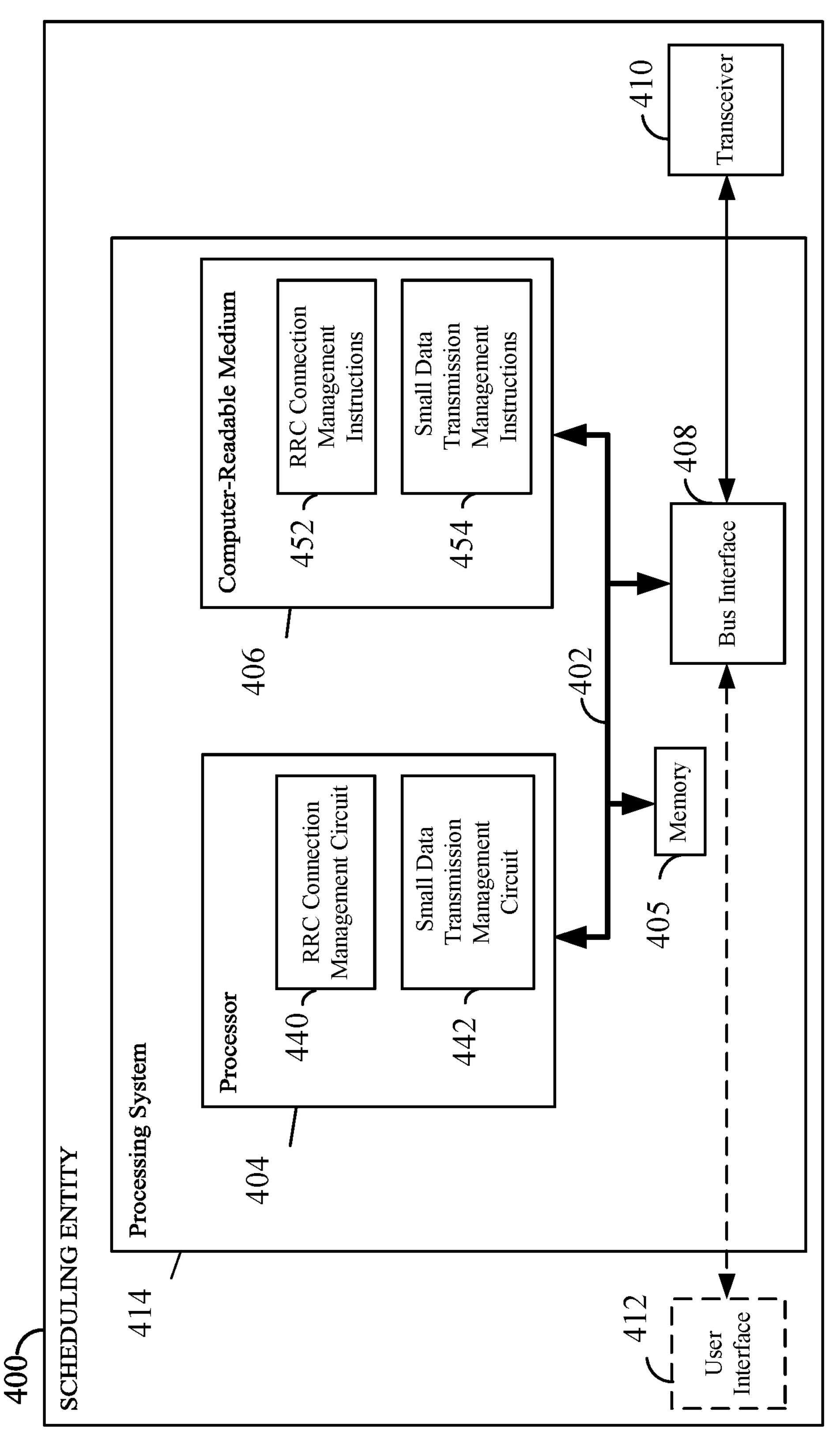
FIG. 4 is a block diagram conceptually illustrating an example of a hardware implementation for a scheduling entity in accordance with some aspects of this disclosure.

FIG. 4 is a block diagram illustrating an example of a hardware implementation for a scheduling entity 400 employing a processing system 414. For example, the scheduling entity 400 may be a user equipment (UE) as illustrated in any one or more of FIGS. 1 and/or 2. In another example, the scheduling entity 400 may be a base station as illustrated in any one or more of FIGS. 1 and/or 2.

The scheduling entity 400 may include a processing system 414 having one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be configured (e.g., in coordination with the memory 405) to implement any one or more of the processes and procedures described below and illustrated in FIGS. 8-12.

The processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and some examples, such as a base station, may omit it.

In some aspects of the disclosure, the processor 404 may include radio resource control (RRC) connection management circuitry 440 configured (e.g., in coordination with the memory 405) for various functions, including, e.g., managing an RRC state of one or more UEs. For example, the RRC connection management circuitry 440 may be configured to implement one or more of the functions described below in relation to FIG. 8, including, e.g., block 806; in relation to FIG. 9, including, e.g., block 922; in relation to FIG. 10, including, e.g., block 1006; in relation to FIG. 11, including, e.g., block 1124; and in relation to FIG. 12, including, e.g., blocks 1206 and/or 1218.

In some further aspects of the disclosure, the processor 404 may include a small data transmission (SDT) management circuit 442 configured (e.g., in coordination with the memory 405) for various functions, including, e.g., enabling SDT sessions for a UE transitioning to an inactive state, allocating resources to the UE, etc. For example, the SDT management circuit 442 may be configured to implement one or more of the functions described below in relation to FIG. 10, including, e.g., block 1008.

The processor 404 is responsible for managing the bus 402 and general processing, including the execution of software stored on the computer-readable medium 406. The software, when executed by the processor 404, causes the processing system 414 to perform the various functions described below for any particular apparatus. The processor 404 may also use the computer-readable medium 406 and the memory 405 for storing data that the processor 404 manipulates when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable storage medium 406 may store computer-executable code that includes RRC connection management instructions 452 that configure a scheduling entity 400 for various functions, including, e.g., managing an RRC state of one or more UEs. For example, the RRC connection management instructions 452 may be configured to cause a scheduling entity 400 to implement one or more of the functions described below in relation FIG. 8, including, e.g., block 806; in relation to FIG. 9, including, e.g., block 922; in relation to FIG. 10, including, e.g., block 1006; in relation to FIG. 11, including, e.g., block 1124; and in relation to FIG. 12, including, e.g., blocks 1206 and/or 1218.

In some further aspects of the disclosure, the computer-readable storage medium 406 may store computer-executable code that includes SDT management instructions 454 that configure a scheduling entity 400 for various functions, including, e.g., enabling SDT sessions for a UE transitioning to an inactive state, allocating resources to the UE for SDT, etc. For example, the SDT management instructions 454 may be configured to cause a scheduling entity 400 to implement one or more of the functions described below in relation to FIG. 10, including, e.g., block 1008.

In one configuration, the apparatus 400 for wireless communication includes means for managing an RRC connection, means for enabling SDT sessions, and means for allocating resources to the UE for SDT. In one aspect, the aforementioned means may be the processor(s) 404 shown in FIG. 4 configured to perform the functions recited by the aforementioned means. In another aspect, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1 and/or 2, and utilizing, for example, the processes and/or algorithms described herein in relation to any one or more of FIGS. 6 to 12.

Figure 5:
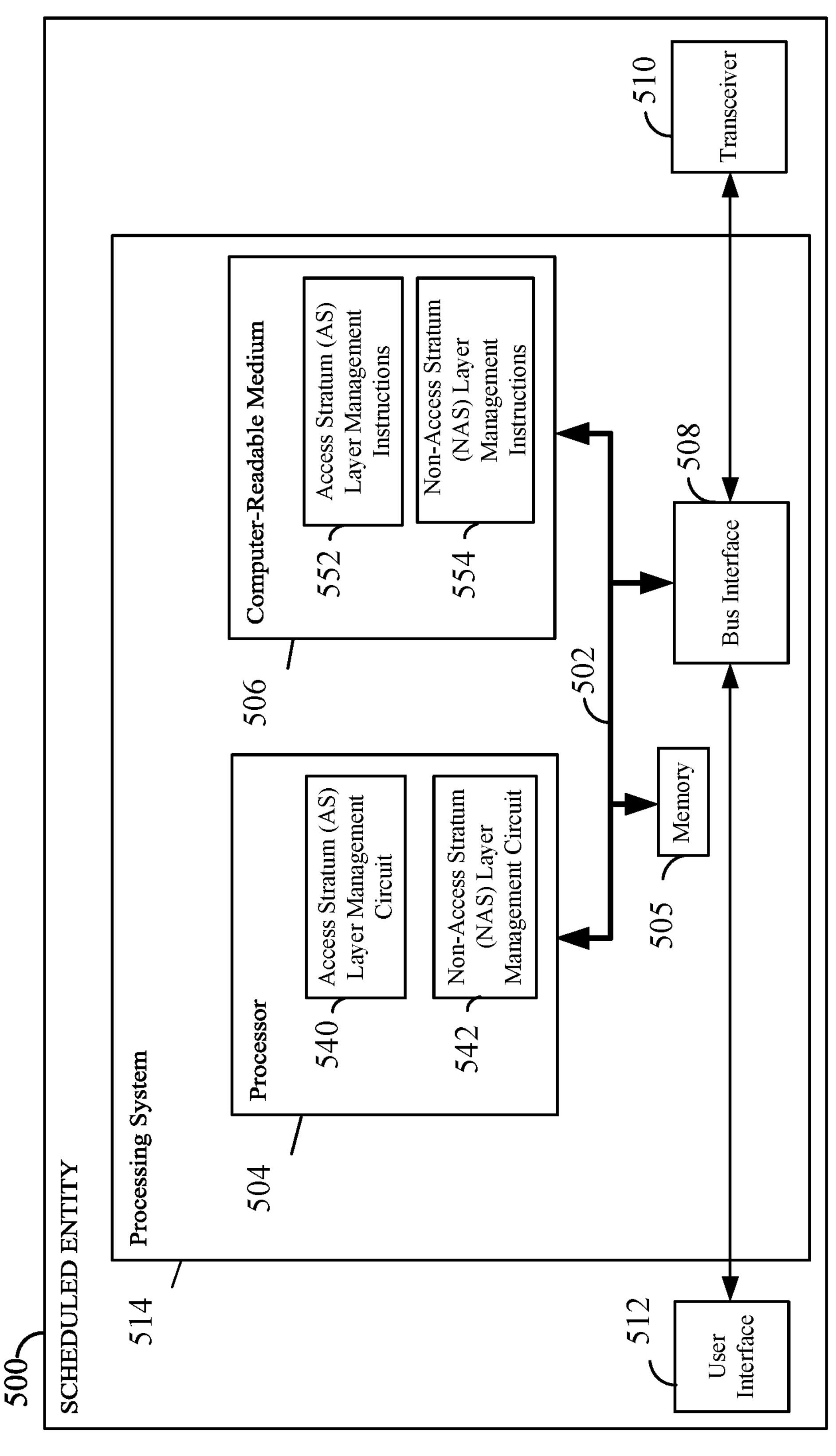
FIG. 5 is a block diagram conceptually illustrating an example of a hardware implementation for a scheduled entity in accordance with some aspects of this disclosure.

FIG. 5 is a conceptual diagram illustrating an example of a hardware implementation for an exemplary scheduled entity 500 employing a processing system 514. In accordance with various aspects of the disclosure, a processing system 514 may include an element, or any portion of an element, or any combination of elements having one or more processors 504. For example, the scheduled entity 500 may be a user equipment (UE) as illustrated in any one or more of FIGS. 1 and/or 2.

The processing system 514 may be substantially the same as the processing system 414 illustrated in FIG. 4, including a bus interface 505, a bus 502, memory 505, a processor 504, and a computer-readable medium 506. Furthermore, the scheduled entity 500 may include a user interface 512 and a transceiver 510 substantially similar to those described above in FIG. 4. That is, the processor 504, as utilized in a scheduled entity 500, may be configured (e.g., in coordination with the memory 505) to implement any one or more of the processes described below and illustrated in FIGS. 6 to 12.

In some aspects of the disclosure, the processor 504 may include access stratum (AS) layer management circuitry 540 configured (e.g., in coordination with the memory 505) for various functions, including, for example, providing indications that transmission of data while the scheduled entity 500 is in an inactive state is supported and/or enabled for the AS layer (e.g., an indication that the AS layer supports SDT), providing indications of whether the AS layer is transmitting data while the scheduled entity 500 is in an inactive state (e.g., whether the AS layer is using SDT), providing indications that a state of the scheduled entity 500 has changed (e.g., from RRC connected to RRC inactive, from RRC inactive to RRC connected, etc.), receiving messages and/or other information from the NAS layer. For example, the AS) layer management circuitry 540 may be configured to implement one or more of the functions described below in relation to FIG. 6, including, e.g., block 606; in relation to FIG. 7, including, e.g., block 706; in relation to FIG. 8, including, e.g., blocks 806, 808, 816, and/or 818; in relation to FIG. 9, including, e.g., blocks 910, 916, and/or 920; in relation to FIG. 10, including, e.g., blocks 1006, 1010, 1018, and/or 1020; in relation to FIG. 11, including, e.g., blocks 1106, 1116, and/or 1122; in relation to FIG. 12, including, e.g., blocks 1206, 1214, 1216, 1220, 1222, and/or 1224.

In some further aspects of the disclosure, the processor 504 may include non-access stratum (NAS) layer management circuitry 542 configured (e.g., in coordination with the memory 505) for various functions, including, for example, providing NAS messages to the AS layer, providing requests to resume a connected state (e.g., an RRC connected state), providing requests to the AS layer to indicate whether indications that transmission of data while the scheduled entity 500 is in an inactive state is supported and/or enabled for the AS layer, receiving indications that transmission of data while the scheduled entity 500 is in an inactive state is supported and/or enabled for the AS layer (e.g., an indication that the AS layer supports SDT), receiving indications of whether the AS layer is transmitting data while the scheduled entity 500 is in an inactive state (e.g., whether the AS layer is using SDT), determining that a procedure which causes a NAS message and/or transmission of an uplink (UL) user data packet has been triggered, receiving indications from the AS layer that a state of the scheduled entity 500 has changed (e.g., from RRC connected to RRC inactive, from RRC inactive to RRC connected, etc.), receiving messages and/or other information from the NAS layer, determining that the NAS layer is to transition to an idle state (e.g., a 5G mobility management (5GMM) idle mode). For example, the AS layer management circuitry 540 may be configured to implement one or more of the functions described below in relation to FIG. 6, including, e.g., blocks 602 and/or 604; in relation to FIG. 7, including, e.g., blocks 702 and/or 704; in relation to FIG. 8, including, e.g., blocks 810, 812, and/or 814; in relation to FIG. 9, including, e.g., blocks 906, 908, 912, 914, and/or 918; in relation to FIG. 10, including, e.g., blocks 1012, 1014, and/or 1016; in relation to FIG. 11, including, e.g., blocks 1108, 1110, 1112, 1114, 1118, and/or 1120; in relation to FIG. 12, including, e.g., blocks 1208, 1210, 1212, and/or 1222.

In some aspects of the disclosure, the computer-readable storage medium 506 may store computer-executable code that includes AS layer management instructions 552 that configure a scheduled entity 500 for various functions, including, for example, providing indications that transmission of data while the scheduled entity 500 is in an inactive state is supported and/or enabled for the AS layer (e.g., an indication that the AS layer supports SDT), providing indications of whether the AS layer is transmitting data while the scheduled entity 500 is in an inactive state (e.g., whether the AS layer is using SDT), providing indications that a state of the scheduled entity 500 has changed (e.g., from RRC connected to RRC inactive, from RRC inactive to RRC connected, etc.), receiving messages and/or other information from the NAS layer. For example, the AS layer management instructions 552 may be configured to cause a scheduled entity 500 to implement one or more of the functions described below in relation to FIG. 6, including, e.g., block 606; in relation to FIG. 7, including, e.g., block 706; in relation to FIG. 8, including, e.g., blocks 806, 808, 816, and/or 818; in relation to FIG. 9, including, e.g., blocks 910, 916, and/or 920; in relation to FIG. 10, including, e.g., blocks 1006, 1010, 1018, and/or 1020; in relation to FIG. 11, including, e.g., blocks 1106, 1116, and/or 1122; in relation to FIG. 12, including, e.g., blocks 1206, 1214, 1216, 1220, 1222, and/or 1224. The AS layer management instructions 552 may further be configured to cause a scheduled entity 500 to implement an AS layer management module that is configured to perform one or more of the preceding functions.

In some further aspects of the disclosure, the computer-readable storage medium 506 may store computer-executable code that includes NAS layer management instructions 554 that configure a scheduled entity 500 for various functions, including, for example, providing NAS messages to the AS layer, providing requests to resume a connected state (e.g., an RRC connected state), providing requests to the AS layer to indicate whether indications that transmission of data while the scheduled entity 500 is in an inactive state is supported and/or enabled for the AS layer, receiving indications that transmission of data while the scheduled entity 500 is in an inactive state is supported and/or enabled for the AS layer (e.g., an indication that the AS layer supports SDT), receiving indications of whether the AS layer is transmitting data while the scheduled entity 500 is in an inactive state (e.g., whether the AS layer is using SDT), determining that a procedure which causes a NAS message and/or transmission of an uplink (UL) user data packet has been triggered, receiving indications from the AS layer that a state of the scheduled entity 500 has changed (e.g., from RRC connected to RRC inactive, from RRC inactive to RRC connected, etc.), receiving messages and/or other information from the NAS layer, determining that the NAS layer is to transition to an idle state (e.g., a 5G mobility management (5GMM) idle mode). For example, the NAS layer management instructions 554 may be configured to cause a scheduled entity 500 to implement one or more of the functions described below in relation to FIG. 6, including, e.g., blocks 602 and/or 604; in relation to FIG. 7, including, e.g., blocks 702 and/or 704; in relation to FIG. 8, including, e.g., blocks 810, 812, and/or 814; in relation to FIG. 9, including, e.g., blocks 906, 908, 912, 914, and/or 918; in relation to FIG. 10, including, e.g., blocks 1012, 1014, and/or 1016; in relation to FIG. 11, including, e.g., blocks 1108, 1110, 1112, 1114, 1118, and/or 1120; in relation to FIG. 12, including, e.g., blocks 1208, 1210, 1212, and/or 1222. The NAS layer management instructions 554 may further be configured to cause a scheduled entity 500 to implement a NAS layer management module that is configured to perform one or more of the preceding functions.

In one configuration, the apparatus 500 for wireless communication includes means for providing a NAS message to be transmitted to a mobility management entity via a base station, means for providing a request to resume an RRC connection, means for transmitting a NAS message and/or an UL user data packet to the base station while the UE is in the RRC inactive state, means for receiving an indication that the AS layer supports transmission of data while the UE is in the RRC inactive state, means for providing a request to indicate whether the AS layer supports transmission of data while the UE is in the RRC inactive state, means for determining that a procedure which causes sending of the NAS message has been triggered, providing the NAS message to be transmitted to the base station to the AS layer, means for determining that the NAS layer is to transition to an idle state, means for providing a request to indicate whether the AS layer is transmitting data while the UE is in the RRC inactive state, means for receiving an indication that the AS layer is transmitting data while the UE is in the RRC inactive state, means for receiving an indication that the AS layer is not transmitting data while the UE is in the RRC inactive state, means for receiving a downlink NAS message while the UE is in the RRC inactive state, means for performing an NAS procedure based on the downlink NAS message while the UE maintains the RRC inactive state, means for receiving an indication that transmission of data while the UE is in the RRC inactive state is enabled, means for receiving an indication that transmission of data while the UE is in the RRC inactive state is active, means for receiving an indication that transmission of data while the UE is in the RRC inactive state is inactive, means for determining whether transmission of data while the UE is in the RRC inactive state is inactive, means for providing a cause value associated with transmitting a request to transmit the NAS message while the UE is in the RRC inactive state, and/or means for providing an indication that one single uplink is expected in connection with the NAS message, means for providing an indication that a subsequent downlink message is expected. In one aspect, the aforementioned means may be the processor(s) 504 shown in FIG. 5 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1 and/or 2, and utilizing, for example, the processes and/or algorithms described herein in relation to FIGS. 6, 7, 8, 9, 10, 11, and/or 12.

Figure 6:
FIG. 6 is a flow chart illustrating an exemplary process for transmitting an NAS message using small data transmission in accordance with some aspects of this disclosure.
Figure 6:
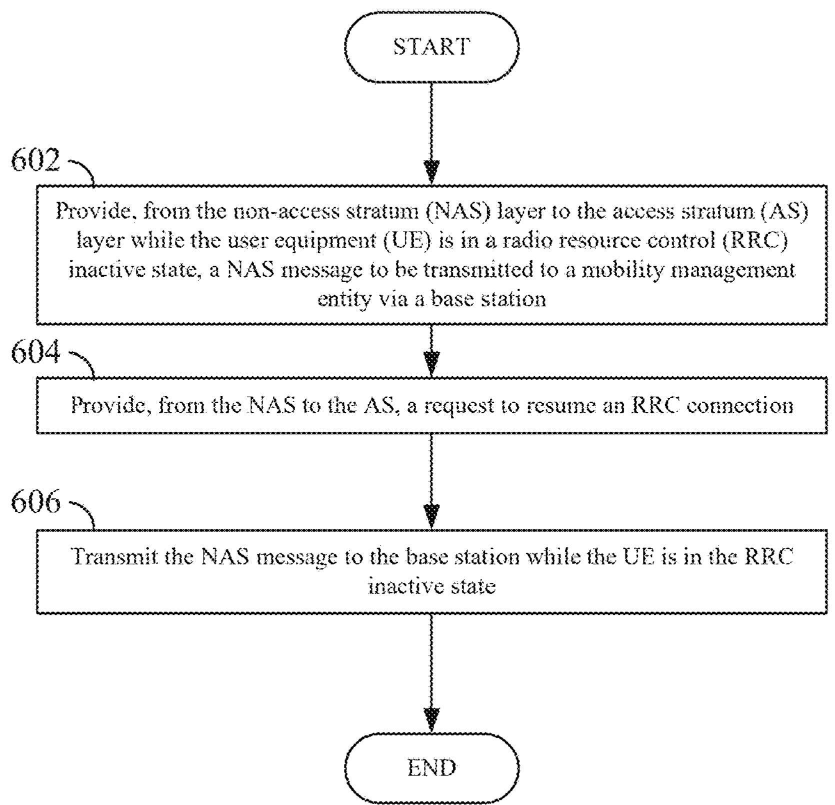

FIG. 6 is a flow chart illustrating an exemplary process 600 for transmitting an NAS message using small data transmission in accordance with some aspects of this disclosure. As described below, some or all illustrated features may be omitted in a particular implementation within the scope of the present disclosure, and some illustrated features may not be required for implementation of all embodiments. In some examples, the process illustrated in FIG. 6 may be carried out by the scheduled device 500 illustrated in FIG. 5. In some examples, the process of FIG. 6 may be carried out by any suitable apparatus or means for carrying out the functions or algorithm described below.

In some aspects of the disclosure, a scheduled device (e.g., the UE 106, the scheduled entity 500) may, at 602, provide a non-access stratum (NAS) message to be transmitted to a mobility management function (AMF) (or other mobility management entity (MME)) within the core network 102 via a scheduling device (e.g., the base station 108). For example, the scheduled device may provide the NAS message from a NAS layer associated with the scheduled device to an access stratum (AS) layer associated with the scheduled device while the scheduled device is in a radio resource control (RRC) inactive state. As described below in connection with FIG. 8, the scheduled entity may provide the NAS message from the NAS layer to the AS layer when the scheduled device is in an RRC inactive state, and the AS layer supports small data transmission. In some aspects of the disclosure, providing the NAS message to the AS layer while the scheduled device is in an RRC inactive state may facilitate transmission of the NAS message to the AMF using a small data transmission session prior to the RRC connection being resumed. This may reduce the latency of the NAS message.

In some aspects of the disclosure, the scheduled device may provide the NAS message to the AS layer using any suitable technique or combination of techniques. For example, the NAS layer may be associated with a NAS management circuit (e.g., implemented by the processor 504) and/or NAS management instructions (e.g., stored using the computer-readable medium 506) that cause a NAS management module to be executed, which may cause the NAS message to be provided to an AS management circuit (e.g., implemented by the processor 504) and/or an AS management module executed based on AS management instructions (e.g., stored using the computer-readable medium 506). In some aspects of the disclosure, the NAS management circuit and/or NAS management module may pass the NAS message together with a request to the AS layer to transition to an RRC connected state. For example, the NAS management circuit and/or NAS management module may pass the NAS message concurrently with an RRC resume request. As another example, the NAS management circuit and/or NAS management module may pass the NAS message as part a payload of an RRC resume request. In some aspects of the disclosure, NAS messages provided from the NAS layer to the AS layer to transition to an RRC connected state may be referred to as an uplink NAS message or uplink NAS signaling. In some aspects of the disclosure, the NAS message may include any suitable information (e.g., in addition to a request to resume an RRC connection), such as an RRC resume cause, an access category, and access identities.

In some aspects of the disclosure, the scheduled device may, at 604, provide a request from the NAS to the AS to resume an RRC connection. For example, the scheduled device may request that the AS transition to an RRC connected state. In some aspects of the disclosure, providing such an RRC resume request to the AS may facilitate resumption of the RRC connection for transmission of the NAS message in the event that the AS does not transmit the NAS message via an SDT session. This may provide a mechanism for the NAS message to be transmitted regardless of whether the AS layer transmits the message via SDT, facilitating operation of SDT that is transparent to the NAS layer (e.g., the NAS layer may operate without determining whether the NAS message should be transmitted via SDT).

In some aspects of the disclosure, the scheduled device may provide the RRC resume request to the AS layer using any suitable technique or combination of techniques. For example, the NAS management circuit and/or NAS management module may cause the RRC resume request to be provided to the AS management circuit and/or AS management module.

In some aspects of the disclosure, the scheduled device may, at 606, transmit the NAS message to the base station while the scheduled device is in the RRC inactive state. For example, the scheduled device may transmit the NAS message using resources configured for small data transmission (SDT). In a particular example, the scheduled device may transmit the NAS message in connection with a MSG3 of a 4-step radio access channel (RACH) process (e.g., an RRC connection request). As another more particular example, the scheduled device may transmit the NAS message in connection with a MSGA of a 2-step RACH process (e.g., an RRC connection request). The NAS message may be included as at least a portion of a payload of the MSGA. As yet another more particular example, the scheduled device may transmit the NAS message using an UL slot assigned to the scheduled device via a grant-free scheduling process (sometimes referred to as configured grant and transmission without grant).

In some aspects of the disclosure, the scheduled device may include any suitable information and/or content with the message. For example, the scheduled device may transmit a common control channel (CCH) message, and the NAS message.

In some aspects of the disclosure, the scheduled device may transmit the NAS message and/or any other suitable data using any suitable communication interface, such as a transceiver (e.g., transceiver 510). In some aspects, the scheduled device may use any suitable signaling radio bearers (SRBs), such as SRB1 and/or SRB2. Additionally or alternatively, the scheduled device may use a suitable data radio bearers (DRB) to transmit the NAS message and/or any suitable data via small data transmission. In some aspects of the disclosure, transmitting the NAS message while the scheduled device is in an RRC inactive state may facilitate earlier transmission of the NAS message to the AMF (e.g., using a small data transmission session prior to the RRC connection being resumed). This may reduce the latency of the NAS message.

Figure 7:
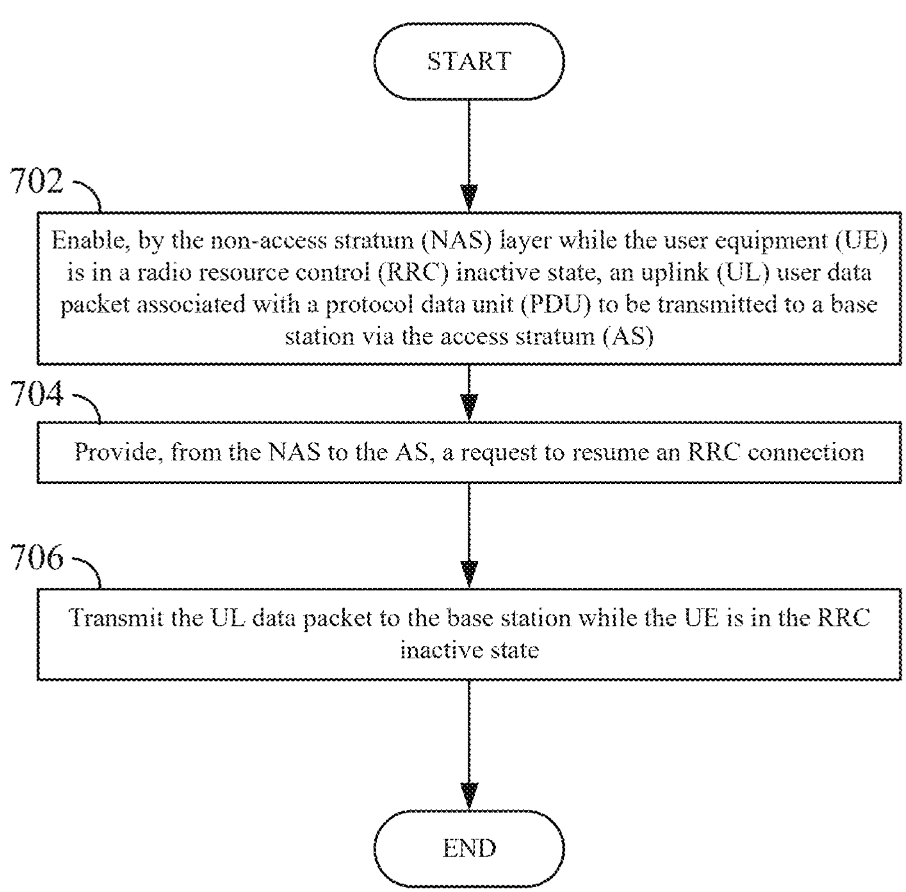
FIG. 7 is a flow chart illustrating an exemplary process for transmitting an uplink user data packet using small data transmission in accordance with some aspects of this disclosure.

FIG. 7 is a flow chart illustrating an exemplary process for transmitting an uplink user data packet using small data transmission in accordance with some aspects of this disclosure. As described below, some or all illustrated features may be omitted in a particular implementation within the scope of the present disclosure, and some illustrated features may not be required for implementation of all embodiments. In some examples, the process illustrated in FIG. 7 may be carried out by the scheduled device 500 illustrated in FIG. 5. In some examples, the process of FIG. 7 may be carried out by any suitable apparatus or means for carrying out the functions or algorithm described below.

In some aspects of the disclosure, a scheduled device (e.g., the UE 106, the scheduled entity 500) may, at 702, enable an uplink (UL) user data packet associated with a protocol data unit to be transmitted to a scheduling device (e.g., the base station 108). For example, a NAS layer associated with the scheduled device may enable transmission of the UL user data packet via an AS layer associated with the scheduled device while the scheduled device is in an RRC inactive state. As described below in connection with FIG. 10, the scheduled entity may enabled transmission of the UL user data packet when the scheduled device is in an RRC inactive state, and the AS layer is enabled to use small data transmission. In some aspects of the disclosure, enabling transmission of the UL user data packet while the scheduled device is in an RRC inactive state may facilitate transmission of the UL user data packet to the scheduling entity using a small data transmission session prior to the RRC connection being resumed. This may reduce the latency of the UL user data packet.

In some aspects of the disclosure, the scheduled device may enable transmission of the UL user data packet using any suitable technique or combination of techniques. For example, the NAS layer may be associated with a NAS management circuit (e.g., implemented by the processor 504) and/or NAS management instructions (e.g., stored using the computer-readable medium 506) that cause a NAS management module to be executed, which may enable transmission of the UL user data packet by an AS management circuit (e.g., implemented by the processor 504) and/or an AS management module executed based on AS management instructions (e.g., stored using the computer-readable medium 506).

In some aspects of the disclosure, the scheduled device may, at 704, provide a request from the NAS to the AS to resume an RRC connection. For example, the scheduled device may request that the AS transition to an RRC connected state. In some aspects of the disclosure, providing such an RRC resume request to the AS may facilitate resumption of the RRC connection for transmission of the UL user data packet in the event that the AS does not transmit the UL user data packet via an SDT session. This may provide a mechanism for the UL user data packet to be transmitted regardless of whether the AS layer transmits the packet via SDT, facilitating operation of SDT that is transparent to the NAS layer (e.g., the NAS layer may operate without determining whether the UL user data packet should be transmitted via SDT).

In some aspects of the disclosure, the scheduled device may provide the RRC resume request to the AS layer using any suitable technique or combination of techniques. For example, the NAS management circuit and/or NAS management module may cause the RRC resume request to be provided to the AS management circuit and/or AS management module.

In some aspects of the disclosure, the scheduled device may, at 706, transmit the UL user data packet to the base station while the scheduled device is in the RRC inactive state. For example, the scheduled device may transmit the UL user data packet using resources configured for small data transmission (SDT). In a particular example, the scheduled device may transmit at least a portion of the UL user data packet in connection with a MSG3 of a 4-step radio access channel (RACH) process (e.g., an RRC connection request). As another more particular example, the scheduled device may transmit at least a portion of the UL user data packet in connection with a MSGA of a 2-step RACH process (e.g., an RRC connection request). At least a portion of the UL user data packet may be included as at least a portion of a payload of the MSGA. As yet another more particular example, the scheduled device may transmit the UL user data packet using an UL slot assigned to the scheduled device via a grant-free scheduling process.

In some aspects of the disclosure, the scheduled device may include any suitable information and/or content with the message. For example, the scheduled device may transmit a common control channel (CCH) message, and at least a portion of the UL user data packet.

In some aspects of the disclosure, the scheduled device may transmit the UL user data packet and/or any other suitable data using any suitable communication interface, such as a transceiver (e.g., transceiver 510). In some aspects, the scheduled device may use any suitable data radio bearer(s) (DRB) to transmit the UL user data packet and/or any suitable data via small data transmission.

Figure 8:
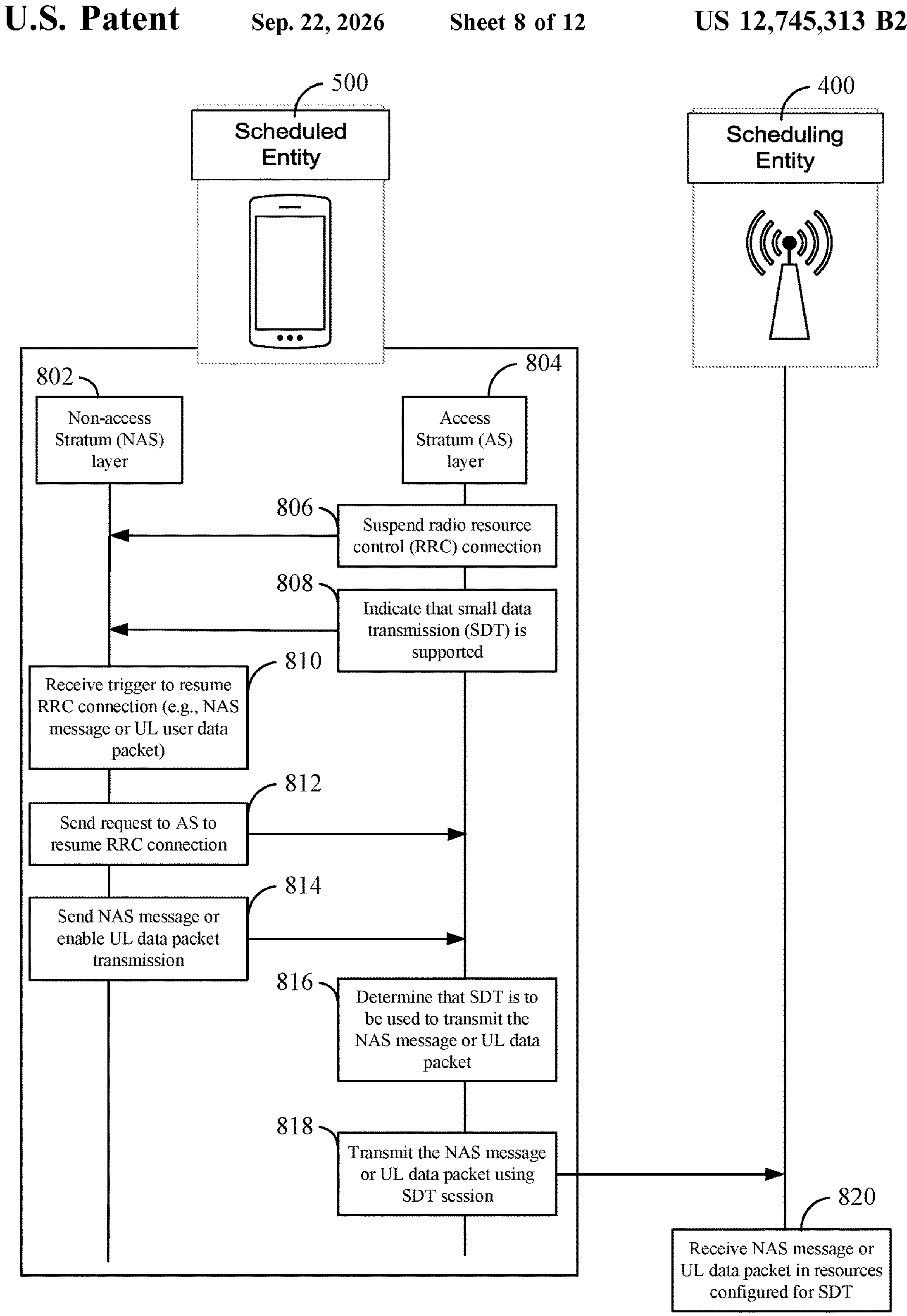
FIG. 8 is a call flow diagram illustrating an exemplary process for transmitting an NAS message and/or an uplink user data packet using small data transmission in accordance with some aspects of this disclosure.

FIG. 8 is a call flow diagram illustrating an exemplary process for transmitting an NAS message and/or an uplink user data packet using small data transmission in accordance with some aspects of this disclosure. As described below, some or all illustrated features may be omitted in a particular implementation within the scope of the present disclosure, and some illustrated features may not be required for implementation of all embodiments. In some examples, the process of FIG. 8 may be carried out by the scheduled device 500 of FIG. 5 and/or the scheduling device 400 of FIG. 4. In some examples, the process of FIG. 8 may be carried out by any suitable apparatus or means for carrying out the functions or algorithm described below. In a more particular example, at least a portion of the process of FIG. 8 may be carried out by a non-access stratum (NAS) layer 802 and/or an access stratum (AS) layer 804. In such an example, operations associated with the NAS layer 802 may be performed by a NAS management circuit (e.g., implemented by the processor 504) and/or a NAS management module executed based on NAS management instructions (e.g., stored using the computer-readable medium 506). Operations associated with the AS layer 804 may be performed by an AS management circuit (e.g., implemented by the processor 504) and/or an AS management module executed based on AS management instructions (e.g., stored using the computer-readable medium 506).

At 806, the AS layer 804 associated with a scheduled entity (e.g., the UE 106, the scheduled entity 500) may provide an indication to the NAS layer 802 indicating that an RRC connection is being suspended and/or has been suspended. In some aspects, the AS layer may suspend an RRC connection in response to any suitable instruction, such as an instruction from a scheduling device (e.g., the base station 108, the scheduling device 400) to suspend the RRC connection.

In some aspects of the disclosure, the indication provided at 806 that the RRC connection is being and/or has been suspended may indicate that the scheduled device is transitioning (or has transitioned) from an RRC connected state to an RRC inactive state (e.g., in response to an RRC release from the scheduling device 400).

In some embodiments, the NAS layer 802 may transition from a 5G mobility management (5GMM) connected mode to a 5GMM connected mode with RRC inactive indication based on the indication provided at 806 (e.g., in response to the indication).

At 808, the AS layer 804 may provide an indication that the AS layer 804 supports small data transmission (SDT), which may be configured to transmit relatively small amounts of data during the RRC inactive state.

In some aspects of the disclosure, the AS layer 804 may provide the indication that SDT is supported using any suitable technique or combination of techniques. For example, AS layer may set a particular bit in a message conveying the suspension of the RRC connection to indicate whether SDT is supported (e.g., with 1 indicating that SDT is supported, and 0 indicating that SDT is not supported, or vice versa).

At 810, the NAS layer 802 may receive a trigger that causes the NAS layer to request that the RRC connection be resumed. In some aspects of the disclosure, any suitable trigger may cause the NAS layer to request that the RRC connection be resumed. For example, the NAS layer 802 may generate a NAS message to be provided to mobility management function (AMF). In a more particular example, the NAS layer 802 may generate a NAS message to carry location information from the upper layer, and may attempt to send the location information to the AMF via the NAS message. As another example, the NAS layer 802 may receive an indication (e.g., from an upper layer, such as an application layer or a connection management layer in an operating system of the scheduled device) that an uplink (UL) user data packet is to be transmitted to a destination (e.g., via the scheduling device 400). In some aspects, the NAS layer 802 may receive the trigger at 810 at any suitable time subsequent to the RRC connection being suspended and the RRC connection being resumed (or a transition to an RRC idle state).

At 812, the NAS layer 802 may send a request to the AS layer to resume the RRC connection. For example, the scheduled device may request that the AS transition to an RRC connected state in response to the trigger received at 810. In some aspects of the disclosure, the NAS layer 802 sending such an RRC resume request to the AS layer 804 may facilitate resumption of the RRC connection for transmission of the NAS message and/or UL user data packet in the event that the AS layer 804 determines that SDT is not to be used to transmit the NAS message and/or UL user data packet. This may provide a mechanism for the NAS message to be transmitted regardless of whether the AS layer transmits the NAS message and/or UL user data packet via SDT, facilitating operation of SDT that is transparent to the NAS layer (e.g., the NAS layer may operate without determining whether the NAS message or UL user data packet should be transmitted via SDT).

In some aspects of the disclosure, the scheduled device 400 may provide the RRC resume request to the AS layer using any suitable technique or combination of techniques. For example, the NAS layer 802 may cause the RRC resume request to be provided to the AS layer 804.

At 814, the NAS layer may send a NAS message to be transmitted and/or may enable the AS layer to transmit an UL user data packet for a PDU. In some aspects of the disclosure, the NAS layer 802 may provide the NAS message to be transmitted and/or may enable the UL user data packet to be transmitted to the AS layer 804 using any suitable technique or combination of techniques. For example, the NAS layer 802 may pass the NAS message within a body of the RRC resume request sent at 812. As another example, NAS layer 802 may pass the NAS message as a separate message. As yet another example, the NAS layer 802 may enable transmission of the UL user data packet.

Alternatively, in some aspects of the disclosure, if the AS layer 804 does not indicate that SDT is supported (and/or explicitly indicates that SDT is not supported), the NAS layer 802 may wait to send the NAS message to the AS layer 804 until the AS layer 804 indicates to the NAS layer 802 that the scheduled device is in an RRC connected state. For example, if the AS layer 804 indicates that SDT is not supported (e.g., explicitly or by omission), the NAS layer 802 may send an RRC resume request at 812, and may omit sending the NAS message at 814 in connection with the RRC resume request. In such an example, the AS layer 804 may transmit an RRC resume request to the network. After the scheduled device moves to an RRC connected state, the AS layer 804 may indicate to the NAS layer 802 that scheduled device is in the RRC connected state, and in response the NAS layer 802 may pass the NAS message to AS layer 804.

At 816, the AS layer 804 may determine whether to transmit the NAS message and/or the UL user data packet using a small data transmission (SDT) session using any suitable technique or combination of techniques. For example, the AS layer 804 may determine whether to transmit the NAS message and/or UL user data packet based on a size of the NAS message and/or UL data packet. In such an example, if the NAS message and/or UL user data packet is below a threshold size, the AS layer 804 may determine that the NAS message and/or UL user data packet are to be transmitted using an SDT session. As another example, the AS layer 804 may determine whether to transmit the NAS message and/or UL user data packet based on an indication from the NAS layer 802 of whether additional data is to be transmitted and/or received. In some aspects, a threshold size for SDT may be configured by a scheduling device (e.g., in connection with a transition of the scheduled device from RRC connected to RRC inactive). Alternatively, a threshold size for SDT may be pre-defined in a standard.

In some aspects of the disclosure, the NAS layer 802 may provide an indication (e.g., via a cause value) associated with the NAS message while the scheduled device is in the RRC inactive state. Such a cause value may cause the AS layer 804 to transmit the NAS message using SDT (e.g., if SDT is enabled). For example, the NAS layer 802 may be configured to determine whether to initiate transmission via SDT of messages that do not exceed a threshold size. In such an example, the NAS layer 802 may prompt the AS layer 804 to utilize an SDT session to transmit the NAS message (e.g., in lieu of the AS layer 804 determining whether to transmit the NAS message via an SDT message).

At 818, if the AS layer 804 determines that the NAS message and/or UL data packet is to be transmitted using an SDT session, the AS layer 804 may transmit the NAS message and/or UL user data packet layer to the scheduling entity 400 in an SDT session.

In some aspects of the disclosure, the scheduled device may transmit the NAS message, at least a portion of the UL user data packet, and/or any other suitable data using any suitable communication interface, such as a transceiver (e.g., transceiver 510). In some aspects, the scheduled device 500 may use any suitable signaling radio bearers (SRBs), such as SRB1 and/or SRB2 to transmit the NAS message. Additionally or alternatively, the scheduled device 500 may use one or more suitable data radio bearers (DRB) to transmit at least a portion of the UL user data packet, and/or any other suitable data via an SDT session. In some aspects of the disclosure, transmitting the NAS message and/or at least a portion of the UL user data packet while the scheduled device is in an RRC inactive state may facilitate earlier transmission of the NAS message to the AMF and/or at least a portion of the UL user data packet (e.g., to a destination via the scheduling device 400). This may reduce the latency of the NAS message and/or UL user data packet.

In some aspects of the disclosure, the scheduled device 500 may include any suitable information and/or content with the message. For example, the scheduled device may transmit a common control channel (CCH) message, and the NAS message.

At 820, the scheduling device 400 may receive the NAS message and/or at least a portion of the UL user data packet transmitted using resources (e.g., one or more resource blocks) configured for SDT. For example, the scheduling device 400 may configure particular resources to be used for an SDT session, and may transmit an indication of which resource(s) are to be used to transmit data in an SDT session.

In some aspects of the disclosure, the scheduling device 400 may further process the NAS message and/or the UL user data packet using any suitable technique or combination of techniques. For example, the scheduling device 400 may transmit the NAS message to an AMF as though the NAS message were received from the NAS layer during an RRC connected state (e.g., rather than within an SDT transmission from the AS layer during an RRC inactive state). As another example, the scheduling device 400 may cause the UL data packet to be transmitted to a destination associated with the UL user data packet.

In some aspects of the disclosure, the AS layer may transmit any suitable number of SDT messages during an SDT session without transitioning to RRC connected.

Figure 9:
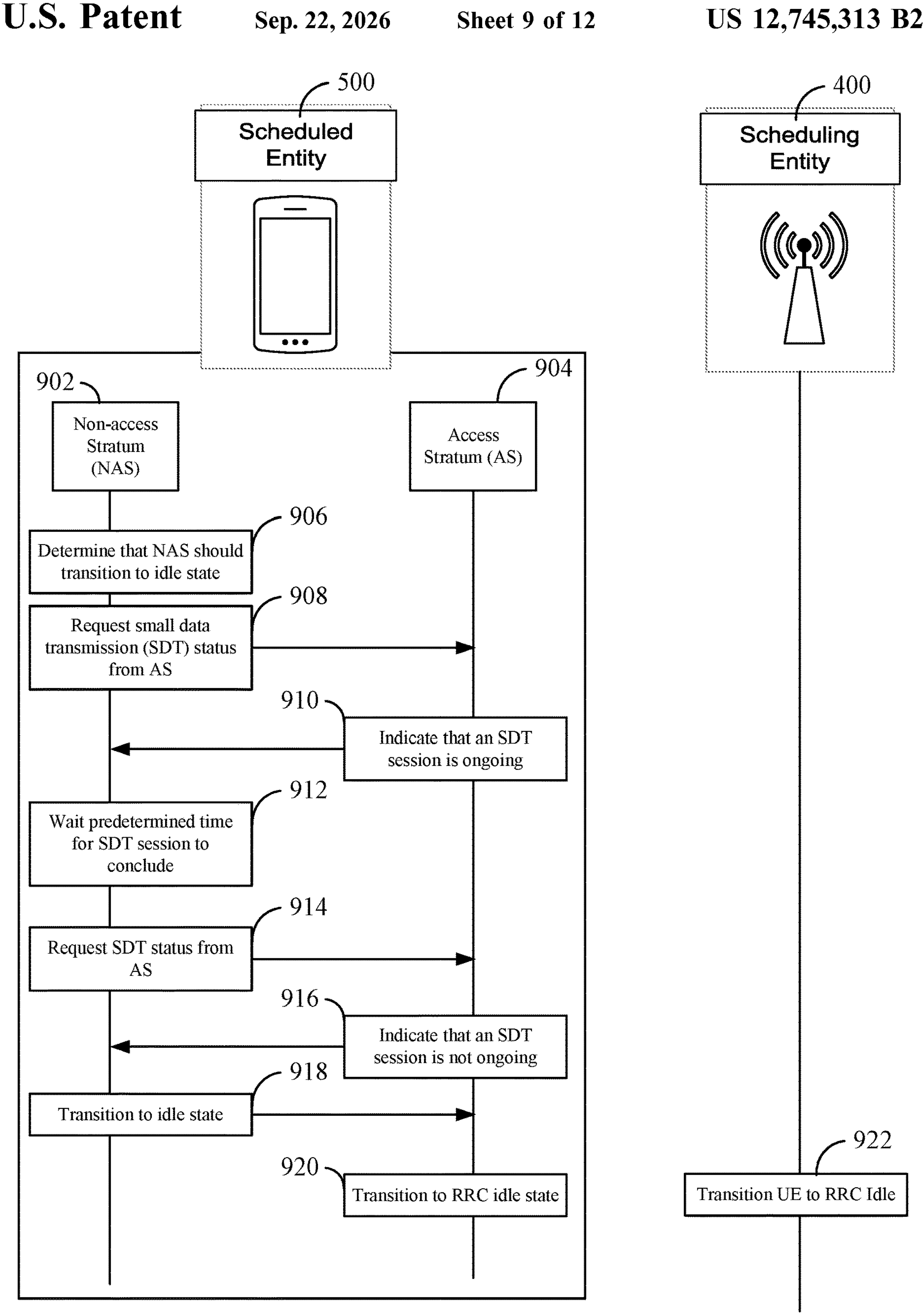
FIG. 9 is a call flow diagram illustrating an exemplary process for transitioning to an NAS idle state in accordance with some aspects of this disclosure.

FIG. 9 is a call flow diagram illustrating an exemplary process for transitioning to an NAS idle state in accordance with some aspects of this disclosure. As described below, some or all illustrated features may be omitted in a particular implementation within the scope of the present disclosure, and some illustrated features may not be required for implementation of all embodiments. In some examples, the process of FIG. 9 may be carried out by the scheduled device 500 of FIG. 5 and/or the scheduling device 400 of FIG. 4. In some examples, the process of FIG. 9 may be carried out by any suitable apparatus or means for carrying out the functions or algorithm described below. In a more particular example, at least a portion of the process of FIG. 9 may be carried out by a non-access stratum (NAS) layer 902 and/or an access stratum (AS) layer 904. In such an example, operations associated with the NAS layer 902 may be performed by a NAS management circuit (e.g., implemented by the processor 504) and/or a NAS management module executed based on NAS management instructions (e.g., stored using the computer-readable medium 506). Operations associated with the AS layer 904 may be performed by an AS management circuit (e.g., implemented by the processor 504) and/or an AS management module executed based on AS management instructions (e.g., stored using the computer-readable medium 506).

At 906, the NAS layer 902 associated with a scheduled entity (e.g., the UE 106, the scheduled entity 500) may determine that the NAS layer 902 should (or must) transition to an idle state (e.g., a 5GMM idle mode). In some aspects of the disclosure, the NAS layer 902 should transition to the idle mode in response to any suitable condition(s), and/or for any other suitable reason. For example, the NAS layer 902 may receive a trigger to send a registration request message to initiate a registration procedure for mobility and/or periodic registration. In a more particular example, the NAS layer 902 may receive a trigger to send a registration request message with an NG-RAN-RCU bit of a 5GS update type IE set to "UE radio capability update needed" (e.g., as described in 3GPP TS 24.501 Release 15).

At 908, the NAS layer 902 may send a request to the AS layer 904 to request a status of a small data transmission (SDT) session. In some aspects of the disclosure, the NAS layer 902 may send the request using any suitable technique or combination of techniques. For example, NAS layer 902 may request a status of a SDT session flag. As another example, the NAS layer 902 may send a query for status of SDT session to the AS layer 904.

At 910, the AS layer 904 may indicate that an SDT session is ongoing using any suitable technique or combination of techniques. For example, the AS layer may respond to the request from the NAS at 908 with an indication that an SDT session flag is set to a particular value (e.g., with 1 indicating that SDT is ongoing, and 0 indicating that SDT is not ongoing, or vice versa).

At 912, the NAS layer 902 may wait a predetermined amount of time for the ongoing SDT session to conclude (e.g., based on an indication that an SDT session is ongoing sent at 910).

At 914, the NAS layer 902 may send another request to the AS layer 904 to request a status of an SDT session (e.g., after the predetermined amount of time has elapsed). Additionally or alternatively, the NAS layer 902 may wait for a response from the AS layer 904 (e.g., the indication at 910 that the SDT session is ongoing), and if a response is not received, the NAS layer 902 may consider the lack of a response as an indication that an SDT session is ongoing. For example, in lieu of sending the indication of whether an SDT session is ongoing at 910, when an SDT session is ongoing, the AS layer may wait until the SDT session has terminated (e.g., if an SDT session is ongoing when the request for SDT status sent at 908 is received at the AS layer 904) to send an indication that an SDT session is not ongoing (e.g., an indication that an SDT session has been terminated).

At 916, the AS layer 904 may indicate that an SDT session is not ongoing using any suitable technique or combination of techniques.

At 918, the NAS layer 902 may transition to an idle state (e.g., a 5GMM-IDLE mode) using any suitable technique or combination of techniques. In some aspects of the disclosure, the scheduled device 500 may remove an RRC context (e.g., a UE inactive AS context), which may include removing an AS security context. In some aspects, the NAS layer 902 may provide an indication to the AS layer 904 to transition to an RRC idle state. In some aspects, inhibiting the NAS layer 902 from transitioning to an idle state while an SDT session is ongoing (e.g., until the SDT session is deactivated) may reduce a likelihood of disrupting packet delivery.

At 920, the AS layer 904 may transition to an RRC idle state based on the NAS layer transitioning to an idle state at 918.

In some aspects, the AS layer 904 may locally release an RRC connection when the scheduled device transitions to an RRC idle state.

At 922, the scheduling device 400 may transition the scheduled device 500 to an RRC idle state using any suitable technique or combination of techniques. For example, the scheduling entity 400 may deregister the scheduled device 500 after a threshold time has elapsed without an active session between the scheduled device 500 and the scheduling device 400.

Figure 10:
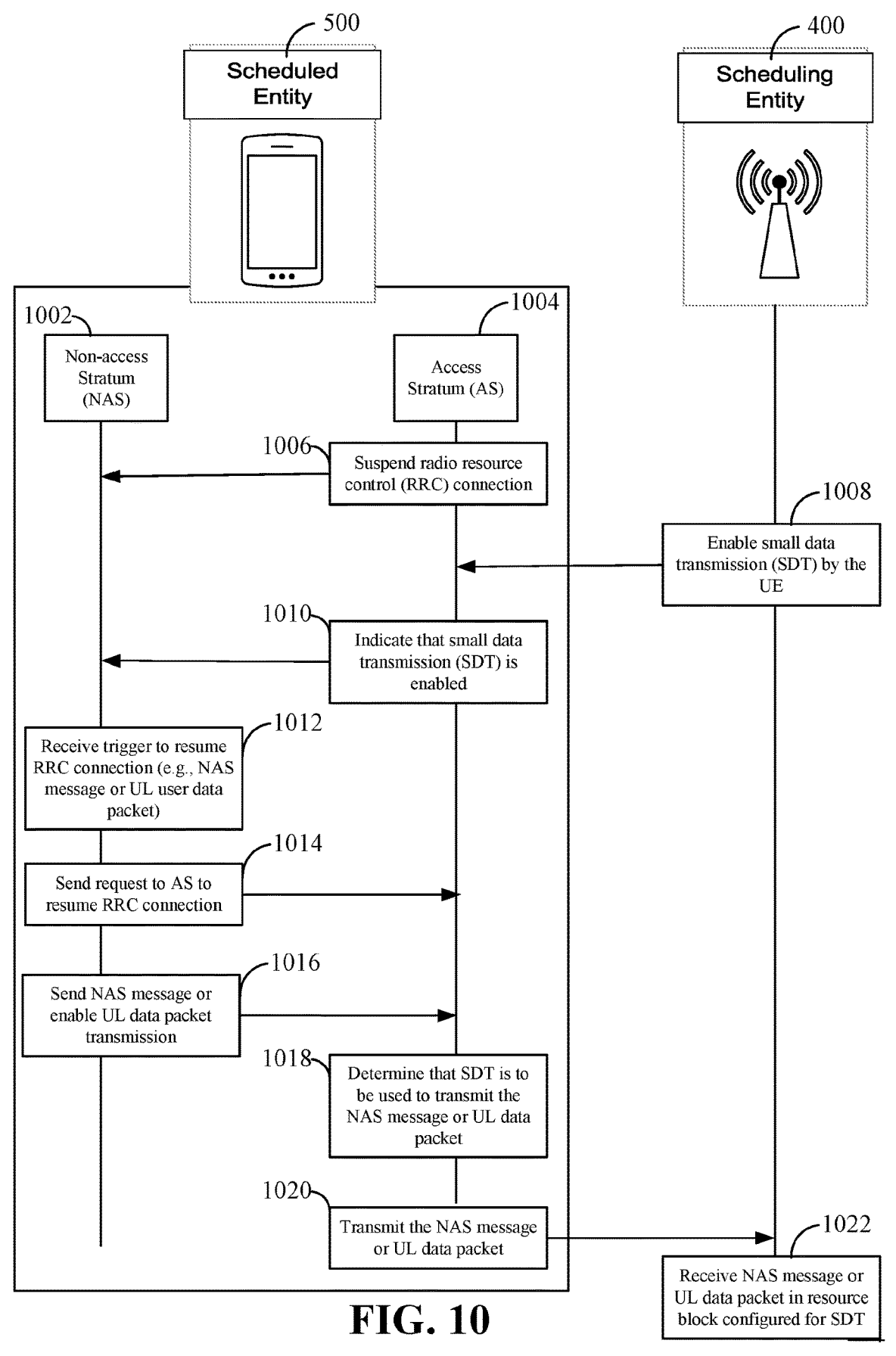

FIG. 10 is another call flow diagram illustrating an exemplary process for transmitting an NAS message and/or an uplink user data packet using small data transmission in accordance with some aspects of this disclosure. As described below, some or all illustrated features may be omitted in a particular implementation within the scope of the present disclosure, and some illustrated features may not be required for implementation of all embodiments. In some examples, the process of FIG. 10 may be carried out by the scheduled device 500 of FIG. 5 and/or the scheduling device 400 of FIG. 4. In some examples, the process of FIG. 10 may be carried out by any suitable apparatus or means for carrying out the functions or algorithm described below. In a more particular example, at least a portion of the process of FIG. 10 may be carried out by a non-access stratum (NAS) layer 1002 and/or an access stratum (AS) layer 1004. In such an example, operations associated with the NAS layer 1002 may be performed by a NAS management circuit (e.g., implemented by the processor 504) and/or a NAS management module executed based on NAS management instructions (e.g., stored using the computer-readable medium 506). Operations associated with the AS layer 1004 may be performed by an AS management circuit (e.g., implemented by the processor 504) and/or an AS management module executed based on AS management instructions (e.g., stored using the computer-readable medium 506).

At 1006, the AS layer 1004 associated with a scheduled entity (e.g., the UE 106, the scheduled entity 500) may provide an indication to the NAS layer 1002 indicating that an RRC connection is being suspended and/or has been suspended. In some aspects, the AS layer may suspend an RRC connection in response to any suitable instruction, such as an instruction from a scheduling device (e.g., the base station 108, the scheduling device 400) to suspend the RRC connection.

In some aspects of the disclosure, the indication provided at 1006 that the RRC connection is being and/or has been suspended may indicate that the scheduled device is transitioning (or has transitioned) from an RRC connected state to an RRC inactive state (e.g., in response to an RRC release from the scheduling device 400).

In some embodiments, the NAS layer 1002 may transition from a 5G mobility management (5GMM) connected mode to a 5GMM connected mode with RRC inactive indication based on the indication provided at 1006 (e.g., in response to the indication).

At 1008, the scheduling device 400 may enable small data transmission (SDT) by the scheduled device 500 during the RRC inactive state. For example, in connection with a transition from the RRC connection state to the RRC inactive state, the scheduled device 500 may request that SDT be enabled, and the scheduling entity may enable SDT (e.g., by assigning resources to the scheduled device 400 to utilize for SDT while the scheduled device is in an RRC inactive state).

At 1010, the AS layer 1004 may provide an indication that the SDT is enabled. In some aspects of the disclosure, the AS layer 1004 may provide the indication that SDT is enabled using any suitable technique or combination of techniques. For example, AS layer 1004 may set a particular bit in a message conveying the suspension of the RRC connection to indicate whether SDT is enabled (e.g., with 1 indicating that SDT is enabled, and 0 indicating that SDT is not enabled, or vice versa).

At 1012, the NAS layer 1002 may receive a trigger that causes the NAS layer 1002 to request that the RRC connection be resumed. In some aspects of the disclosure, any suitable trigger may cause the NAS layer 1002 to request that the RRC connection be resumed. For example, the NAS layer 1002 may generate a NAS message to be provided to an AMF. In a more particular example, the NAS layer 1002 may generate a NAS message to carry location information from the upper layer, and may attempt to send the location information to the AMF via the NAS message. As another example, the NAS layer 1002 may receive an indication (e.g., from an upper layer, such as an application layer or a connection management layer in an operating system of the scheduled device) that an uplink (UL) user data packet is to be transmitted to a destination (e.g., via the scheduling device 400). In some aspects, the NAS layer 1002 may receive the trigger at 1012 at any suitable time subsequent to the RRC connection being suspended and the RRC connection being resumed (or a transition to an RRC idle state).

At 1014, the NAS layer 1002 may send a request to the AS layer 1004 to resume the RRC connection. For example, the scheduled device may request that the AS layer 1004 transition to an RRC connected state in response to the trigger received at 1012. In some aspects of the disclosure, the NAS layer 1002 sending such an RRC resume request to the AS layer 1004 may facilitate resumption of the RRC connection for transmission of the NAS message and/or an UL user data packet in the event that the AS layer 1004 determines that SDT is not to be used to transmit the NAS message and/or UL user data packet. This may provide a mechanism for the NAS message to be transmitted regardless of whether the AS layer transmits the NAS message and/or UL user data packet via SDT, facilitating operation of SDT that is transparent to the NAS layer (e.g., the NAS layer may operate without determining whether the NAS message or UL user data packet should be transmitted via SDT).

In some aspects of the disclosure, the scheduled device 400 may provide the RRC resume request to the AS layer 1004 using any suitable technique or combination of techniques. For example, the NAS layer 1002 may cause the RRC resume request to be provided to the AS layer 1004.

At 1016, the NAS layer may send a NAS message to be transmitted and/or may enable the AS layer to transmit an UL user data packet for a PDU. In some aspects of the disclosure, the NAS layer 1002 may provide the NAS message to be transmitted to the AS layer 1004 and/or may enable the UL user data packet to be transmitted using any suitable technique or combination of techniques. For example, the NAS layer 1002 may pass the NAS message within a body of the RRC resume request sent at 1012. As another example, NAS layer 1002 may pass the NAS message as a separate message. As yet another example, the NAS layer 1002 may enable transmission of the UL user data packet.

Alternatively, in some aspects of the disclosure, if the AS layer 1004 does not indicate that SDT is enabled (and/or explicitly indicates that SDT is not enabled), the NAS layer 1002 may wait to send the NAS message to the AS layer 1004 until the AS layer 1004 indicates to the NAS layer 1002 that the scheduled device is in an RRC connected state. For example, if the AS layer 1004 indicates that SDT is not supported (e.g., explicitly or by omission), the NAS layer 1002 may send an RRC resume request at 1014, and may omit sending the NAS message at 1016 in connection with the RRC resume request. In such an example, the AS layer 1004 may transmit an RRC resume request to the network. After the scheduled device moves to an RRC connected state, the AS layer 1004 may indicate to the NAS layer 1002 that scheduled device is in the RRC connected state, and in response the NAS layer 1002 may pass the NAS message to AS layer 1004.

At 1018, the AS layer 1004 may determine whether to transmit the NAS message and/or the UL user data packet using a small data transmission (SDT) session using any suitable technique or combination of techniques. For example, the AS layer 1004 may determine whether to transmit the NAS message and/or UL user data packet based on a size of the NAS message and/or UL data packet. In such an example, if the NAS message and/or UL user data packet is below a threshold size, the AS layer 1004 may determine that the NAS message and/or UL user data packet are to be transmitted using an SDT session. As another example, the AS layer 1004 may determine whether to transmit the NAS message and/or UL user data packet based on an indication from the NAS layer 1002 of whether additional data is to be transmitted and/or received. In some aspects, a threshold size for SDT may be configured by a scheduling device (e.g., in connection with a transition of the scheduled device from RRC connected to RRC inactive). Alternatively, a threshold size for SDT may be pre-defined in a standard.

In some aspects of the disclosure, the NAS layer 1002 may provide an indication (e.g., via a cause value) associated with the NAS message while the scheduled device is in the RRC inactive state. Such a cause value may cause the AS layer 1004 to transmit the NAS message using SDT (e.g., if SDT is enabled). For example, the NAS layer 1002 may be configured to determine whether to initiate transmission via SDT of messages that do not exceed a threshold size. In such an example, the NAS layer 1002 may prompt the AS layer 1004 to utilize an SDT session to transmit the NAS message (e.g., in lieu of the AS layer 1004 determining whether to transmit the NAS message via an SDT message).

At 1020, if the AS layer 1004 determines that the NAS message and/or UL data packet is to be transmitted using an SDT session, the AS layer 1004 may transmit the NAS message and/or UL user data packet layer to the scheduling entity 400 in an SDT session.

In some aspects of the disclosure, the scheduled device may transmit the NAS message, at least a portion of the UL user data packet, and/or any other suitable data using any suitable communication interface, such as a transceiver (e.g., transceiver 510). In some aspects, the scheduled device 500 may use any suitable signaling radio bearers (SRBs), such as SRB1 and/or SRB2 to transmit the NAS message. Additionally or alternatively, the scheduled device 500 may use one or more suitable data radio bearers (DRB) to transmit at least a portion of the UL user data packet, and/or any other suitable data via an SDT session. In some aspects of the disclosure, transmitting the NAS message and/or at least a portion of the UL user data packet while the scheduled device is in an RRC inactive state may facilitate earlier transmission of the NAS message to the AMF and/or at least a portion of the UL user data packet (e.g., to a destination via the scheduling device 400). This may reduce the latency of the NAS message and/or UL user data packet.

In some aspects of the disclosure, the scheduled device 500 may include any suitable information and/or content with the message. For example, the scheduled device may transmit a common control channel (CCH) message, and the NAS message.

At 1022, the scheduling device 400 may receive the NAS message and/or at least a portion of the UL user data packet transmitted using resources (e.g., one or more resource blocks) configured for SDT. For example, the scheduling device 400 may configure particular resources to be used for an SDT session, and may transmit an indication of which resource(s) are to be used to transmit data in an SDT session.

In some aspects of the disclosure, the scheduling device 400 may further process the NAS message and/or the UL user data packet using any suitable technique or combination of techniques. For example, the scheduling device 400 may transmit the NAS message to an AMF as though the NAS message were received from the NAS layer during an RRC connected state (e.g., rather than within an SDT transmission from the AS layer during an RRC inactive state). As another example, the scheduling device 400 may cause the UL data packet to be transmitted to a destination associated with the UL user data packet.

In some aspects of the disclosure, the AS layer 1004 may transmit any suitable number of SDT messages during an SDT session without transitioning to RRC connected.

Figure 11:
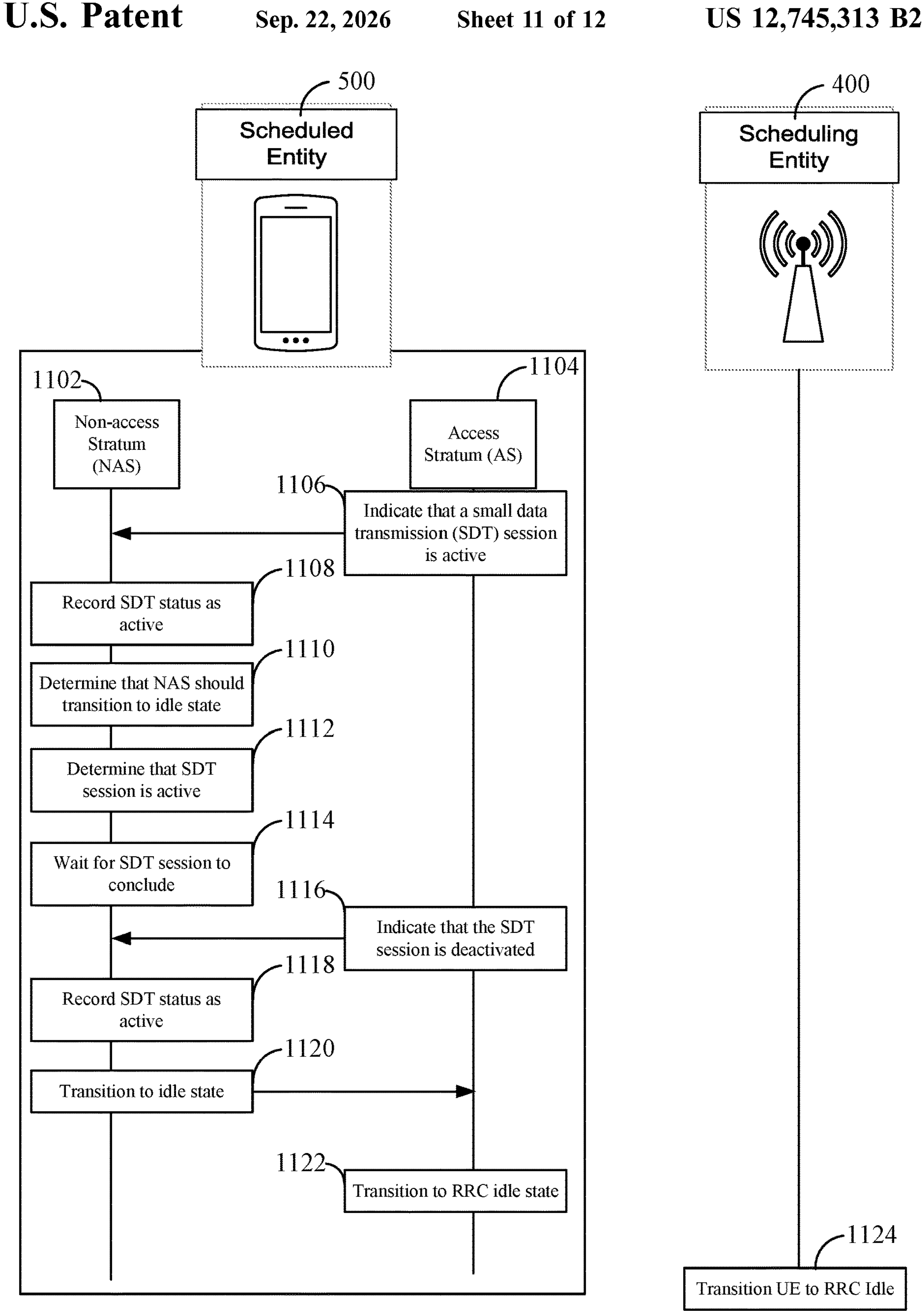
FIG. 11 is another call flow diagram illustrating an exemplary process for transitioning to an NAS idle state in accordance with some aspects of this disclosure.

FIG. 11 is another call flow diagram illustrating an exemplary process for transitioning to an NAS idle state in accordance with some aspects of this disclosure. As described below, some or all illustrated features may be omitted in a particular implementation within the scope of the present disclosure, and some illustrated features may not be required for implementation of all embodiments. In some examples, the process of FIG. 11 may be carried out by the scheduled device 500 of FIG. 5 and/or the scheduling device 400 of FIG. 4. In some examples, the process of FIG. 11 may be carried out by any suitable apparatus or means for carrying out the functions or algorithm described below. In a more particular example, at least a portion of the process of FIG. 11 may be carried out by a non-access stratum (NAS) layer 1102 and/or an access stratum (AS) layer 1104. In such an example, operations associated with the NAS layer 1102 may be performed by a NAS management circuit (e.g., implemented by the processor 504) and/or a NAS management module executed based on NAS management instructions (e.g., stored using the computer-readable medium 506). Operations associated with the AS layer 1104 may be performed by an AS management circuit (e.g., implemented by the processor 504) and/or an AS management module executed based on AS management instructions (e.g., stored using the computer-readable medium 506).

At 1106, the AS layer 1104 associated with a scheduled entity (e.g., the UE 106, the scheduled entity 500) may provide an indication that a small data transmission (SDT) session is active. In some aspects of the disclosure, the AS layer 1104 may provide the indication that SDT is active using any suitable technique or combination of techniques. For example, the AS layer 1104 may set a particular bit in a message conveying the suspension of the RRC connection to indicate whether SDT is active (e.g., with 1 indicating that SDT is enabled, and 0 indicating that SDT is not enabled, or vice versa). As another example, the AS layer 1104 may provide an indication to the NAS layer 1102 upon an SDT session being initiated.

At 1108, the NAS layer 1102 may record that the SDT status is active using any suitable technique or combination of techniques. For example, the NAS layer may set an SDT active flag to indicate that the SDT session is active (e.g., by setting a flag to 1 from 0 to indicate that the SDT session is active, or vice versa).

At 1110, the NAS layer 1102 may determine that the NAS layer 1102 should (or must) transition to an idle state (e.g., a 5GMM idle mode). In some aspects of the disclosure, the NAS layer 1102 should transition to the idle mode in response to any suitable condition(s), and/or for any other suitable reason. For example, the NAS layer 1102 may receive a trigger to send a registration request message to initiate a registration procedure for mobility and/or periodic registration. In a more particular example, the NAS layer 1102 may receive a trigger to send a registration request message with an NG-RAN-RCU bit of a 5GS update type IE set to "UE radio capability update needed" (e.g., as described in 3GPP TS 24.501 Release 15).

At 1112, the NAS layer 1102 may determine that an SDT session is active. In some aspects of the disclosure, the NAS layer 1102 may determine that an SDT session is active using any suitable technique or combination of techniques. For example, NAS layer 1102 may check a recorded status of the SDT session (e.g., a status of an SDT session flag). As another example, the NAS layer 1102 may send a query for status of SDT session to the AS layer 1104 (e.g., in addition to, or in lieu of, the AS layer 1104 sending the indication at 1106).

At 1114, the NAS layer 1102 may wait a predetermined amount of time for the ongoing SDT session to conclude (e.g., based on an indication that an SDT session is active at 1112).

At 1116, the AS layer 1104 may provide an indication that a small data transmission (SDT) session is deactivated. In some aspects of the disclosure, the AS layer 1104 may provide the indication that SDT is deactivated using any suitable technique or combination of techniques. For example, the AS layer 1104 may provide an indication to the NAS layer 1102 upon an SDT session being deactivated.

At 1118, the NAS layer 1102 may record that the SDT status is deactivated (or otherwise inactive) using any suitable technique or combination of techniques. For example, the NAS layer 1102 may set an SDT active flag to indicate that the SDT session is active (e.g., by setting a flag to 0 from 1 to indicate that the SDT session is deactivated, or vice versa).

At 1120, the NAS layer 1102 may transition to an idle state (e.g., a 5GMM-IDLE mode) using any suitable technique or combination of techniques. In some aspects of the disclosure, the scheduled device 500 may remove an RRC context (e.g., a UE inactive AS context), which may include removing an AS security context. In some aspects, the NAS layer 1102 may provide an indication to the AS layer 1104 to transition to an RRC idle state. In some aspects, inhibiting the NAS layer 1102 from transitioning to an idle state while an SDT session is ongoing (e.g., until the SDT session is deactivated) may reduce a likelihood of disrupting packet delivery.

At 1122, the AS layer 1104 may transition to an RRC idle state based on the NAS layer 1102 transitioning to an idle state at 1120. In some aspects, the AS layer 1104 may locally release an RRC connection when the scheduled device transitions to an RRC idle state.

At 1124, the scheduling device 400 may transition the scheduled device 500 to an RRC idle state using any suitable technique or combination of techniques. For example, the scheduling entity 400 may deregister the scheduled device 500 after a threshold time has elapsed without an active session between the scheduled device 500 and the scheduling device 400.

Figure 12:
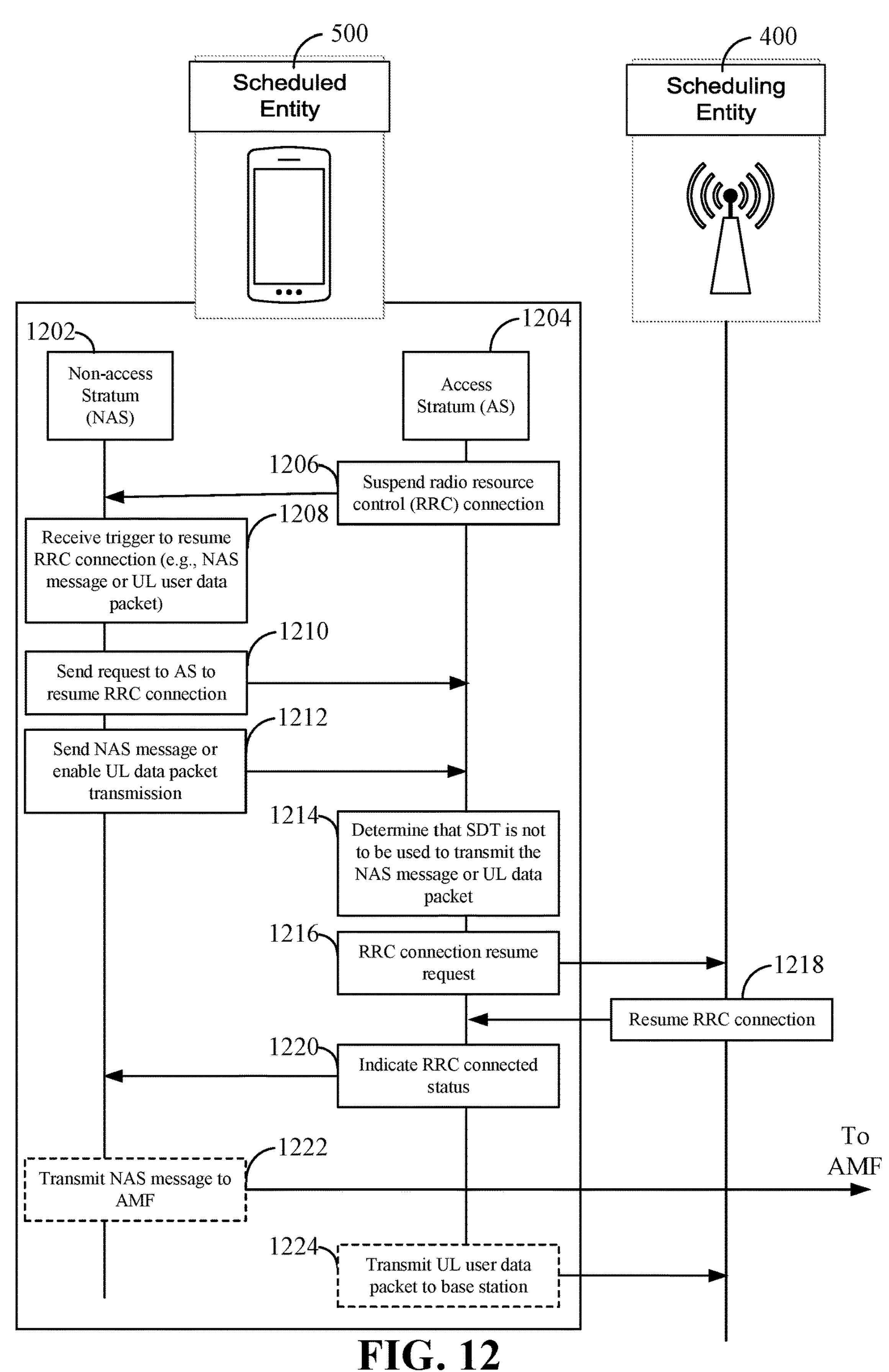
FIG. 12 is a call flow diagram illustrating an exemplary process for transmitting an NAS message and/or an uplink user data packet after determining that small data transmission is not to be used in accordance with some aspects of this disclosure.

FIG. 12 is a call flow diagram illustrating an exemplary process for transmitting an NAS message and/or an uplink user data packet using in accordance with some aspects of this disclosure. As described below, some or all illustrated features may be omitted in a particular implementation within the scope of the present disclosure, and some illustrated features may not be required for implementation of all embodiments. In some examples, the process of FIG. 12 may be carried out by the scheduled device 500 of FIG. 5 and/or the scheduling device 400 of FIG. 4. In some examples, the process of FIG. 12 may be carried out by any suitable apparatus or means for carrying out the functions or algorithm described below. In a more particular example, at least a portion of the process of FIG. 12 may be carried out by a non-access stratum (NAS) layer 1202 and/or an access stratum (AS) layer 1204. In such an example, operations associated with the NAS layer 1202 may be performed by a NAS management circuit (e.g., implemented by the processor 504) and/or a NAS management module executed based on NAS management instructions (e.g., stored using the computer-readable medium 506). Operations associated with the AS layer 1204 may be performed by an AS management circuit (e.g., implemented by the processor 504) and/or an AS management module executed based on AS management instructions (e.g., stored using the computer-readable medium 506).

At 1206, the AS layer 1304 associated with a scheduled entity (e.g., the UE 106, the scheduled entity 500) may provide an indication to the NAS layer 1202 indicating that an RRC connection is being suspended and/or has been suspended. In some aspects, the AS layer 1204 may suspend an RRC connection in response to any suitable instruction, such as an instruction from a scheduling device (e.g., the base station 108, the scheduling device 400) to suspend the RRC connection.

In some aspects of the disclosure, the indication provided at 1206 that the RRC connection is being and/or has been suspended may indicate that the scheduled device is transitioning (or has transitioned) from an RRC connected state to an RRC inactive state (e.g., in response to an RRC release from the scheduling device 400).

In some embodiments, the NAS layer 1202 may transition from a 5G mobility management (5GMM) connected mode to a 5GMM connected mode with RRC inactive indication based on the indication provided at 1206 (e.g., in response to the indication).

At 1208, the NAS layer 1202 may receive a trigger that causes the NAS layer 1202 to request that the RRC connection be resumed. In some aspects of the disclosure, any suitable trigger may cause the NAS layer 1202 to request that the RRC connection be resumed. For example, the NAS layer 1202 may generate a NAS message to be provided to an AMF. In a more particular example, the NAS layer 1202 may generate a NAS message to carry location information from the upper layer, and may attempt to send the location information to the AMF via the NAS message. As another example, the NAS layer 1202 may receive an indication (e.g., from an upper layer, such as an application layer or a connection management layer in an operating system of the scheduled device) that an uplink (UL) user data packet is to be transmitted to a destination (e.g., via the scheduling device 400). In some aspects, the NAS layer 1202 may receive the trigger at 1208 at any suitable time subsequent to the RRC connection being suspended and the RRC connection being resumed (or a transition to an RRC idle state).

At 1210, the NAS layer 1202 may send a request to the AS layer 1204 to resume the RRC connection. For example, the scheduled device may request that the AS layer 1204 transition to an RRC connected state in response to the trigger received at 1208. In some aspects of the disclosure, the NAS layer 1202 sending such an RRC resume request to the AS layer 1204 may facilitate resumption of the RRC connection for transmission of the NAS message and/or an UL user data packet in the event that the AS layer 1204 determines that SDT is not to be used to transmit the NAS message and/or UL user data packet. This may provide a mechanism for the NAS message to be transmitted regardless of whether the AS layer transmits the NAS message and/or UL user data packet via SDT, facilitating operation of SDT that is transparent to the NAS layer (e.g., the NAS layer may operate without determining whether the NAS message or UL user data packet should be transmitted via SDT).

In some aspects of the disclosure, the scheduled device 400 may provide the RRC resume request to the AS layer 1204 using any suitable technique or combination of techniques. For example, the NAS layer 1202 may cause the RRC resume request to be provided to the AS layer 1204.

At 1212, the NAS layer may send a NAS message to be transmitted and/or may enable the AS layer to transmit an UL user data packet for a PDU. In some aspects of the disclosure, the NAS layer 1202 may provide the NAS message to be transmitted to the AS layer 1204 and/or may enable the UL user data packet to be transmitted using any suitable technique or combination of techniques. For example, the NAS layer 1202 may pass the NAS message within a body of the RRC resume request sent at 1210. As another example, NAS layer 1202 may pass the NAS message as a separate message. As yet another example, the NAS layer 1202 may enable transmission of the UL user data packet.

At 1214, the AS layer 1204 may determine that transmission of the NAS message and/or the UL user data packet is not to be carried out using a small data transmission (SDT) session any suitable technique or combination of techniques. For example, the AS layer 1204 may determine whether to transmit the NAS message and/or UL user data packet based on a size of the NAS message and/or UL data packet. In such an example, if the NAS message and/or UL user data packet is above a threshold size, the AS layer 1204 may determine that the NAS message and/or UL user data packet are not to be transmitted using an SDT session (e.g., because the NAS message and/or UL user data packet cannot be transmitted using resources allocated for SDT). As another example, the AS layer 1204 may determine whether to transmit the NAS message and/or UL user data packet based on an indication from the NAS layer 1202 of whether additional data is to be transmitted and/or received (e.g., if sufficient additional data is to be transmitted and/or received, the AS layer 1202 may determine that the scheduled device should transition to RRC connected). In some aspects, a threshold size for SDT may be configured by a scheduling device (e.g., in connection with a transition of the scheduled device from RRC connected to RRC inactive). Alternatively, a threshold size for SDT may be pre-defined in a standard.

At 1216, if the AS layer 1204 determines that the NAS message and/or UL data packet is not to be transmitted using an SDT session, the AS layer 1204 may transmit an RRC connection resume request to the scheduling entity 400 to attempt to transition to the RRC connected state.

In some aspects of the disclosure, the scheduled device may transmit the RRC resume request using any suitable communication interface, such as a transceiver (e.g., transceiver 510). In some aspects, the scheduled device 500 may use any suitable signaling radio bearers (SRBs), such as SRB0 and/or SRB1 to transmit the RRC resume request at 1216. In some aspects of the disclosure, the scheduled device 500 may include any suitable information and/or content with the message. For example, the scheduled device may transmit one or more messages associated with a RACH procedure (e.g., a two-step RACH procedure, or a 4 step RACH procedure).

At 1218, the scheduling device 400 may transmit a message indicating that the scheduled device should transition to RRC connected. For example, the scheduling device 400 may transmit an RRC resume message to the scheduled device.

At 1220, the AS layer 1204 may indicate to the NAS layer 1202 that the AS layer 1204 has transitioned to an RRC connected state.

At 1222, the NAS layer may transmit the NAS message to the AMF in response to the indication that the AS layer 1204 has transitioned to the RRC connected state. For example, the NAS layer 1202 may pass the NAS message to the AS layer for transmission to the AMF via the scheduling entity 400. In some aspects of the disclosure, 1222 may be omitted (e.g., when a NAS message was not the trigger at 1208).

In some aspects of the disclosure, the scheduled device may transmit the NAS message, using any suitable communication interface, such as a transceiver (e.g., transceiver 510). In some aspects, the scheduled device 500 may use any suitable signaling radio bearers (SRBs), such as SRB1 and/or SRB2 to transmit the NAS message.

At 1224, the AS layer 1204 may transmit an UL user data packet to the scheduling device in response to the AS layer 1204 transitioning to the RRC connected state. In some aspects of the disclosure, the scheduled device may transmit the UL user data packet using any suitable communication interface, such as a transceiver (e.g., transceiver 510). In some aspects, the scheduled device 500 may use one or more suitable data radio bearers (DRB) to transmit at least a portion of the UL user data packet, and/or any other suitable data.

In some aspects of the disclosure, the scheduling device 400 may further process the NAS message and/or the UL user data packet using any suitable technique or combination of techniques. For example, the scheduling device 400 may transmit the NAS message to an AMF. As another example, the scheduling device 400 may cause the UL data packet to be transmitted to a destination associated with the UL user data packet.

Further Examples Having a Variety of Features:

Implementation examples are described in the following numbered clauses:

1. A method of wireless communication, comprising: providing, from a non-access stratum (NAS) layer to an access stratum (AS) layer associated with a user equipment (UE) while the UE is in a radio resource control (RRC) inactive state, a NAS message to be transmitted to a mobility management entity via a base station; providing, from the NAS layer, a request to resume an RRC connection; and transmitting the NAS message to the base station while the UE is in the RRC inactive state.

2. The method of clause 1, further comprising: receiving, at the NAS layer, an indication that the AS layer supports transmission of data while the UE is in the RRC inactive state.

3. The method of clause 2, wherein the indication that the AS layer supports transmission of data while the UE is in the RRC inactive state is provided in connection with an indication that an RRC connected state is being suspended.

4. The method of clause 2, further comprising: providing, to the AS layer, a request to indicate whether the AS layer supports transmission of data while the UE is in the RRC inactive state; and receiving, at the NAS layer, the indication that the AS layer supports transmission of data while the UE is in the RRC inactive state in response to the request.

5. The method of the clause 4, further comprising: determining that a procedure which causes sending of the NAS message has been triggered.

6. The method of clause 5, further comprising: providing the request to indicate whether the AS layer supports transmission of data while the UE is in the RRC inactive state prior to determining that the procedure which causes sending of the NAS message has been triggered.

7. The method of clause 5, further comprising: providing the request to indicate whether the AS layer supports transmission of data while the UE is in the RRC inactive state in response to determining that the procedure which causes sending of the NAS message has been triggered.

8. The method of any one of clauses 2 to 7, wherein providing the NAS message to be transmitted to the base station further comprises: providing, to the AS layer, the NAS message to be transmitted to the base station based on the indication that the AS layer supports transmission of data while the UE is in the RRC inactive state.

9. The method of any one of clauses 1 to 8, further comprising: determining that the NAS layer is to transition to an idle state; and providing, to the AS layer, a request to indicate whether the AS layer is transmitting data while the UE is in the RRC inactive state.

10. The method of clause 9, wherein the idle state is a 5G mobile mobility (5GMM) IDLE state.

11. The method of clause 9, further comprising: receiving, from the AS layer, an indication that the AS layer is transmitting data while the UE is in the RRC inactive state; and in response to the indication that the AS layer is transmitting data while the UE is in the RRC inactive state, waiting until the AS layer indicates that data is no longer being transmitted while the UE is in the RRC inactive state before transitioning to the idle state.

12. The method of clause 9, further comprising: receiving, from the AS layer, an indication that the AS layer is not transmitting data while the UE is in the RRC inactive state; and in response to the indication that the AS layer is not transmitting data while the UE is in the RRC inactive state, transitioning to the idle state.

13. The method of any one of clauses 1 to 12, further comprising: receiving a downlink NAS message while the UE is in the RRC-inactive state; and performing an NAS procedure based on the downlink NAS message while the UE maintains the RRC inactive state.

14. The method of clause 1, further comprising: receiving, at the NAS layer, an indication that transmission of data while the UE is in the RRC inactive state is enabled.

15. The method of clause 14, wherein the indication that transmission of data while the UE is in the RRC inactive state is enabled is provided in connection with an indication that an RRC connected state is being suspended.

16. The method of the clause 14, further comprising: determining that a procedure which causes sending of the NAS message has been triggered.

17. The method of clause 16, further comprising: receiving the indication that transmission of data while the UE is in the RRC inactive state is enabled prior to determining that the procedure which causes sending of the NAS message has been triggered.

18. The method of any one of clauses 14 to 17, wherein providing the NAS message to be transmitted to the base station further comprises: providing, to the AS layer, the NAS message to be transmitted to the base station based on the indication that transmission of data while the UE is in the RRC inactive state is enabled.

19. The method of any one of clauses 14 to 18, further comprising: receiving, at the NAS layer, an indication that transmission of data while the UE is in the RRC inactive state is active.

20. The method of clause 19, further comprising: receiving, at the NAS layer subsequent to receiving the indication that transmission of data while the UE is in the RRC inactive state is active, an indication that transmission of data while the UE is in the RRC inactive state is inactive.

21. The method of any one of clauses 19 to 20, further comprising: determining that the NAS layer is to transition to an idle state; and determining whether transmission of data while the UE is in the RRC inactive state is inactive; and in response to determining that transmission of data while the UE is in the RRC inactive state is active, waiting until the AS layer indicates that transmission of data while the UE is in the RRC inactive state is inactive before transitioning to the idle state.

22. The method of any one of clauses 19 to 20, further comprising: determining that the NAS layer is to transition to an idle state; and determining whether transmission of data while the UE is in the RRC inactive state is inactive; and in response to determining that transmission of data while the UE is in the RRC inactive state is inactive, transitioning to the idle state.

23. The method of any one of clauses 21 to 22, wherein the idle state is a 5G mobile mobility (5GMM) IDLE state.

24. The method of any one of clauses 14 to 23, further comprising: receiving a downlink NAS message while the UE is in the RRC-inactive state; and performing an NAS procedure based on the downlink NAS message while the UE maintains the RRC inactive state.

25. The method of any one of clauses 1 to 24, further comprising: determining, at the NAS layer, that the NAS message is to be transmitted while the UE is in the RRC inactive state; providing, to the AS layer from the NAS layer, a cause value associated with transmitting a request to transmit the NAS message while the UE is in the RRC inactive state; and transmitting the NAS message to the base station while the UE is in the RRC inactive state based on the cause value.

26. The method of any one of clauses 1 to 24, wherein the NAS message comprises a location protocol message, the method further comprising: providing, to the AS layer from the NAS layer, a cause value associated with the NAS message; and transmitting the NAS message to a base station while the UE is in the RRC inactive state based on the cause value.

27. The method of any one of clauses 1 to 26, further comprising: providing, to the AS layer from the NAS layer, an indication that one single uplink is expected in connection with the NAS message.

28. The method of any one of clauses 1 to 27, further comprising: providing, to the AS layer from the NAS layer, an indication that a subsequent downlink message is expected.

29. The method of any one of clauses 1 to 28, wherein transmitting the NAS message to the base station while the UE is in the RRC inactive state comprises: transmitting the NAS message in connection with a third message of a four step random access channel (RACH) procedure.

30. The method of any one of clauses 1 to 28, wherein transmitting the NAS message to the base station while the UE is in the RRC inactive state comprises: transmitting the NAS message in connection with a first message of a two step random access channel (RACH) procedure.

31. The method of any one of clauses 1 to 28, wherein transmitting the NAS message to the base station while the UE is in the RRC inactive state comprises: transmitting the NAS message using an uplink slot granted by the base station via RRC signaling.

32. A method of wireless communication, comprising: enabling, by a non-access stratum (NAS) layer associated with a user equipment (UE) while the UE is in a radio resource control (RRC) inactive state, transmission of an uplink (UL) user data packet associated with a protocol data unit (PDU) session to a base station; providing, from the NAS layer, a request to resume a radio resource control (RRC) connection; and transmitting the UL user data packet to the base station while the UE is in the RRC inactive state.

33. The method of clause 32, further comprising: receiving, at the NAS layer, an indication that the AS layer supports transmission of data while the UE is in the RRC inactive state.

34. The method of clause 33, wherein the indication that the AS layer supports transmission of data while the UE is in the RRC inactive state is provided in connection with an indication that an RRC connected state is being suspended.

35. The method of clause 33, further comprising: providing, to the AS layer, a request to indicate whether the AS layer supports transmission of data while the UE is in the RRC inactive state; and receiving, at the NAS layer, the indication that the AS layer supports transmission of data while the UE is in the RRC inactive state in response to the request.

36. The method of the clause 35, further comprising: determining that the UL data packet for the PDU is to be sent with suspended user-plane resources.

37. The method of clause 36, further comprising: providing the request to indicate whether the AS layer supports transmission of data while the UE is in the RRC inactive state prior to determining that the UL data packet for the PDU is to be sent with suspended user-plane resources.

38. The method of clause 36, further comprising: providing the request to indicate whether the AS layer supports transmission of data while the UE is in the RRC inactive state in response to determining that the UL data packet for the PDU is to be sent with suspended user-plane resources.

39. The method of any one of clauses 34 to 38, wherein providing the indication that the UL user data packet for the PDU session is to be transmitted to the base station further comprises: providing, to the AS layer, the indication that the UL user data packet for the PDU session is to be transmitted based on the indication that the AS layer supports transmission of data while the UE is in the RRC inactive state.

40. The method of any one of clauses 32 to 39, further comprising: determining that the NAS layer is to transition to an idle state; and providing, to the AS layer, a request to indicate whether the AS layer is transmitting data while the UE is in the RRC inactive state.

41. The method of clause 40, wherein the idle state is a 5G mobile mobility (5GMM) IDLE state.

42. The method of clause 40, further comprising: receiving, from the AS layer, an indication that the AS layer is transmitting data while the UE is in the RRC inactive state; and in response to the indication that the AS layer is transmitting data while the UE is in the RRC inactive state, waiting until the AS layer indicates that data is no longer being transmitted while the UE is in the RRC inactive state before transitioning to the idle state.

43. The method of clause 40, further comprising: receiving, from the AS layer, an indication that the AS layer is not transmitting data while the UE is in the RRC inactive state; and in response to the indication that the AS layer is not transmitting data while the UE is in the RRC inactive state, transitioning to the idle state.

44. The method of clause 32, further comprising: receiving, at the NAS layer, an indication that transmission of data while the UE is in the RRC inactive state is enabled.

45. The method of clause 44, wherein the indication that transmission of data while the UE is in the RRC inactive state is enabled is provided in connection with an indication that an RRC connected state is being suspended.

46. The method of the clause 44, further comprising: determining that that the UL user data packet for the PDU session is to be transmitted.

47. The method of clause 46, further comprising: receiving the indication that transmission of data while the UE is in the RRC inactive state is enabled prior to determining that the UL user data packet for the PDU session is to be transmitted.

48. The method of any one of clauses 44 to 47, wherein enabling transmission of the UL user data packet for the PDU session to the base station further comprises: enabling, to the AS layer, transmission of the UL user data packet for the PDU session to the base station based on the indication that transmission of data while the UE is in the RRC inactive state is enabled.

49. The method of any one of clauses 44 to 48, further comprising: receiving, at the NAS layer, an indication that transmission of data while the UE is in the RRC inactive state is active.

50. The method of clause 49, further comprising: receiving, at the NAS layer subsequent to receiving the indication that transmission of data while the UE is in the RRC inactive state is active, an indication that transmission of data while the UE is in the RRC inactive state is inactive.
51. The method of any one of clauses 49 to 50, further comprising: determining that the NAS layer is to transition to an idle state; determining whether transmission of data while the UE is in the RRC inactive state is inactive; and in response to determining that transmission of data while the UE is in the RRC inactive state is active, waiting until the AS layer indicates that transmission of data while the UE is in the RRC inactive state is inactive before transitioning to the idle state.
52. The method of any one of clauses 49 to 50, further comprising: determining that the NAS layer is to transition to an idle state; and determining whether transmission of data while the UE is in the RRC inactive state is inactive; and in response to determining that transmission of data while the UE is in the RRC inactive state is inactive, transitioning to the idle state.
53. The method of any one of clauses 51 to 52, wherein the idle state is a 5G mobile mobility (5GMM) IDLE state.
54. The method of any one of clauses 32 to 53, further comprising: providing, to the AS layer from the NAS layer, an indication that a subsequent downlink message is expected.
55. The method of any one of clauses 32 to 53, wherein transmitting the UL data packet to the base station while the UE is in the RRC inactive state comprises: transmitting the UL data packet in connection with a third message of a four step random access channel (RACH) procedure.
56. The method of any one of clauses 32 to 53, wherein transmitting the UL data packet to the base station while the UE is in the RRC inactive state comprises: transmitting the UL data packet in connection with a first message of a two step random access channel (RACH) procedure.
57. The method of any one of clauses 32 to 53, wherein transmitting the UL data packet to the base station while the UE is in the RRC inactive state comprises: transmitting the UL data packet using an uplink slot granted by the base station via RRC signaling.
58. A method of wireless communication, comprising: providing, from anon-access stratum (NAS) layer to an access stratum (AS) layer associated with a user equipment (UE) while the UE is in a radio resource control (RRC) inactive state, a NAS message to be transmitted to a base station; providing, from the NAS layer, a request to resume an RRC connection; receiving, from the AS layer to the NAS layer, an indication that the UE has transitioned to an RRC connected state; and transmitting, via the NAS layer, the NAS message to a mobility management entity subsequent to receiving the indication that the UE has transitioned to an RRC connected state.
58. A method of wireless communication, comprising: providing, from a non-access stratum (NAS) layer to an access stratum (AS) layer associated with a user equipment (UE) while the UE is in a radio resource control (RRC) inactive state, a NAS message to be transmitted to a base station; providing, from the NAS layer, a request to resume an RRC connection; receiving, from the AS layer to the NAS layer, an indication that the UE has transitioned to an RRC connected state; and transmitting, via the NAS layer, the NAS message to a mobility management entity subsequent to receiving the indication that the UE has transitioned to an RRC connected state.
59. An apparatus for wireless communication, comprising: a processor; and a memory communicatively coupled to the at least one processor, wherein the processor and memory are configured to: perform a method of any of clauses 1 to 58.
60. A non-transitory computer-readable medium storing computer-executable code, comprising code for causing a computer to cause a processor to: perform a method of any of clauses 1 to 58.
61. An apparatus for wireless communication, comprising: at least one means for carrying out a method of any of clauses 1 to 58.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Uses of the word “exemplary” in this disclosure means “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the described feature, advantage or mode of operation. Uses of the term “coupled” in this disclosure refers to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms “circuit” and “circuitry” broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions.

Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication, comprising:

providing, from a non-access stratum (NAS) layer to an access stratum (AS) layer associated with a user equipment (UE) while the UE is in a radio resource control (RRC) inactive state, a NAS message to be transmitted to a mobility management entity via a base station;

providing, from the NAS layer to the AS layer, a request to resume an RRC connection;

receiving, at the NAS layer from the AS layer, an indication that the AS layer supports transmission of data while the UE is in the RRC inactive state, wherein providing the NAS message to be transmitted to the base station is based on the indication; and transmitting the NAS message to the base station while the UE is in the RRC inactive state prior to the RRC connection being resumed.

2. The method of claim 1, further comprising:

providing, to the AS layer, a request to indicate whether the AS layer supports transmission of data while the UE is in the RRC inactive state; and receiving, at the NAS layer, the indication that the AS layer supports transmission of data while the UE is in the RRC inactive state in response to the request.

3. The method of the claim 2, further comprising:

determining that a procedure which causes sending of the NAS message has been triggered.

4. The method of claim 1, further comprising:

receiving a downlink NAS message while the UE is in the RRC-inactive state; and performing an NAS procedure based on the downlink NAS message while the UE maintains the RRC inactive state.

5. The method of claim 1, further comprising:

receiving, at the NAS layer, an indication that transmission of data while the UE is in the RRC inactive state is enabled.

6. The method of claim 1, wherein transmitting the NAS message to the base station while the UE is in the RRC inactive state comprises:

transmitting the NAS message in connection with a third message of a four step random access channel (RACH) procedure.

7. The method of claim 1, wherein transmitting the NAS message to the base station while the UE is in the RRC inactive state comprises:

transmitting the NAS message in connection with a first message of a two step random access channel (RACH) procedure.

8. A method of wireless communication, comprising:

enabling, by a non-access stratum (NAS) layer associated with a user equipment (UE) while the UE is in a radio resource control (RRC) inactive state, transmission of an uplink (UL) user data packet associated with a protocol data unit (PDU) session to a base station;

providing, from the NAS layer to the AS layer, a request to resume a radio resource control (RRC) connection;

receiving, at the NAS layer from the AS layer, an indication that the AS layer supports transmission of data while the UE is in the RRC inactive state, wherein providing the UL user data packet to be transmitted to the base station is based on the indication;

and transmitting the UL user data packet to the base station while the UE is in the RRC inactive state prior to the RRC connection being resumed.

9. The method of claim 8, further comprising:

providing, to the AS layer, a request to indicate whether the AS layer supports transmission of data while the UE is in the RRC inactive state; and receiving, at the NAS layer, the indication that the AS layer supports transmission of data while the UE is in the RRC inactive state in response to the request.

10. The method of the claim 9, further comprising:

determining that the UL data packet for the PDU is to be sent with suspended user-plane resources.

11. The method of claim 8, further comprising:

receiving, at the NAS layer, an indication that transmission of data while the UE is in the RRC inactive state is enabled.

12. The method of claim 8, further comprising:

providing, to the AS layer from the NAS layer, an indication that a subsequent downlink message is expected.

13. The method of claim 8, wherein transmitting the UL data packet to the base station while the UE is in the RRC inactive state comprises:

transmitting the UL data packet in connection with a third message of a four step random access channel (RACH) procedure.

14. A wireless communication device, comprising:
a transceiver;
memory; and
one or more processors communicatively coupled to the transceiver and the memory, the one or more processors configured to:
provide, from a non-access stratum (NAS) layer to an access stratum (AS) layer associated with a user equipment (UE) while the UE is in a radio resource control (RRC) inactive state, a NAS message to be transmitted to a mobility management entity via a base station;
provide, from the NAS layer to the AS layer, a request to resume an RRC connection;
receive, at the NAS layer from the AS layer, an indication that the AS layer supports transmission of data while the UE is in the RRC inactive state, wherein providing the NAS message to be transmitted to the base station is based on the indication; and
transmit the NAS message to the base station while the UE is in the RRC inactive state prior to the RRC connection being resumed.

15. The wireless communication device of claim 14, wherein the one or more processors are further configured to:
provide, to the AS layer, a request to indicate whether the AS layer supports transmission of data while the UE is in the RRC inactive state; and
receive, at the NAS layer, the indication that the AS layer supports transmission of data while the UE is in the RRC inactive state in response to the request.

16. The wireless communication device of the claim 15, wherein the one or more processors are further configured to:
determine that a procedure which causes sending of the NAS message has been triggered.

17. The wireless communication device of claim 14, wherein the one or more processors are further configured to:
receive a downlink NAS message while the UE is in the RRC-inactive state; and
perform an NAS procedure based on the downlink NAS message while the UE maintains the RRC inactive state.

18. The wireless communication device of claim 14, wherein the one or more processors are further configured to:
receive, at the NAS layer, an indication that transmission of data while the UE is in the RRC inactive state is enabled.

19. The wireless communication device of claim 14, wherein to transmit the NAS message to the base station while the UE is in the RRC inactive state, the one or more processors are further configured to:
transmit the NAS message in connection with a third message of a four step random access channel (RACH) procedure.

20. The wireless communication device of claim 14, wherein to transmit the NAS message to the base station while the UE is in the RRC inactive state, the one or more processors are further configured to:
transmit the NAS message in connection with a first message of a two step random access channel (RACH) procedure.

21. A wireless communication device, comprising:
a transceiver;
memory; and
one or more processors communicatively coupled to the transceiver and the memory, the one or more processors configured to:
enable, by a non-access stratum (NAS) layer associated with a user equipment (UE) while the UE is in a radio resource control (RRC) inactive state, transmission of an uplink (UL) user data packet associated with a protocol data unit (PDU) session to a base station;
provide, from the NAS layer to the AS layer, a request to resume a radio resource control (RRC) connection;
receive, at the NAS layer from the AS layer, an indication that the AS layer supports transmission of data while the UE is in the RRC inactive state, wherein providing the UL user data packet to be transmitted to the base station is based on the indication; and
transmit the UL user data packet to the base station while the UE is in the RRC inactive state prior to the RRC connection being resumed.

22. The wireless communication device of claim 21, wherein the one or more processors are further configured to:
provide, to the AS layer, a request to indicate whether the AS layer supports transmission of data while the UE is in the RRC inactive state; and
receive, at the NAS layer, the indication that the AS layer supports transmission of data while the UE is in the RRC inactive state in response to the request.

23. The wireless communication device of the claim 22, wherein the one or more processors are further configured to:
determine that the UL data packet for the PDU is to be sent with suspended user-plane resources.

24. The wireless communication device of claim 21, wherein the one or more processors are further configured to:
receiving, at the NAS layer, an indication that transmission of data while the UE is in the RRC inactive state is enabled.

25. The wireless communication device of claim 21, wherein the one or more processors are further configured to:
provide, to the AS layer from the NAS layer, an indication that a subsequent downlink message is expected.

26. The wireless communication device of claim 21, wherein to transmit the UL data packet to the base station while the UE is in the RRC inactive state, the one or more processors are further configured to:
transmit the UL data packet in connection with a third message of a four step random access channel (RACH) procedure.

* * * * *